(12) United States Patent
Daruwalla et al.

(10) Patent No.: US 11,477,035 B1
(45) Date of Patent: *Oct. 18, 2022

(54) SYSTEMS AND METHODS FOR VALUE TRANSFERS USING SIGNCRYPTION

(71) Applicant: Wells Fargo Bank, N.A., San Francisco, CA (US)

(72) Inventors: Jal Daruwalla, Chatham, NJ (US); Phillip H. Griffin, Raleigh, NC (US); Ashia D. Kennon, Aston, PA (US); Michael Knorr, Fairfield, CT (US); Lynnel J. Kresse, Ruskin, FL (US); Catherine Wangari Mwangi, Hackensack, NJ (US); Joanne Strobel-Cort, Summit, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 177 days.

This patent is subject to a terminal disclaimer.

(21) Appl. No.: 16/914,761

(22) Filed: Jun. 29, 2020

Related U.S. Application Data

(63) Continuation of application No. 15/632,631, filed on Jun. 26, 2017, now Pat. No. 10,700,875.

(Continued)

(51) Int. Cl.
*H04L 9/32* (2006.01)
*G06Q 20/04* (2012.01)
(Continued)

(52) U.S. Cl.
CPC .......... *H04L 9/3263* (2013.01); *G06Q 20/04* (2013.01); *G06Q 20/108* (2013.01); *H04L 9/30* (2013.01)

(58) Field of Classification Search
CPC ...... G07F 19/00; G07F 19/203; G07F 19/201; G07F 19/20; H04L 9/32; H04L 63/105;
(Continued)

(56) References Cited

U.S. PATENT DOCUMENTS

| 5,440,634 A | 8/1995 | Jones et al. |
| 6,554,184 B1 | 4/2003 | Amos |

(Continued)

FOREIGN PATENT DOCUMENTS

IN 20150023713 A 7/2016

OTHER PUBLICATIONS

American National Standard for Financial Services ANSI X9.73-2010, Cryptographic Message Syntax-ASN.1 and XML, Apr. 2010. 89 pages.

(Continued)

*Primary Examiner* — Samson B Lemma
(74) *Attorney, Agent, or Firm* — Foley & Lardner LLP

(57) ABSTRACT

A system, method, and apparatus for carrying out a value transfer is provided. A method includes receiving, by a computing system of a financial institution, a de-signcrypted value transfer message including terms of a value transfer from an account of a sending party to an account of a merchant, wherein a receiving party desires to make a purchase from the merchant and the value transfer is a payment from the sending party account to the merchant account; and one or more spending limitations on the desired purchase, wherein the payment is contingent on the desired purchase meeting the spending limitations. The method then includes verifying the authenticity of the de-signcrypted message using a public key of the sending party and a private key of the financial institution; and dispersing funds according to the terms of the value transfer.

20 Claims, 10 Drawing Sheets

Related U.S. Application Data

(60) Provisional application No. 62/492,530, filed on May 1, 2017.

(51) Int. Cl.
*G06Q 20/10* (2012.01)
*H04L 9/30* (2006.01)

(58) Field of Classification Search
CPC ....... H04L 9/3263; H04L 9/30; H04L 9/3271; H04L 12/6418; H04L 9/3247; H04L 9/321; H04L 9/3066; H04L 63/0823; H04L 9/3252; H04L 9/0861; H04L 9/3236; H04L 63/045; H04L 9/0825; H04W 12/08; H04W 12/106; H04W 12/069; H04B 7/18506; G06Q 20/04; G06Q 20/108; G06Q 20/10; G06Q 20/405; G06Q 20/4016; G06Q 30/04; G06Q 20/29; G06Q 30/06; G06Q 20/0658; G06Q 20/20; G06Q 20/3678; G06Q 20/367; G06Q 20/3223; G06Q 20/3276; G06Q 20/403; G06Q 20/384; G06Q 20/229; G06Q 20/102; G06Q 40/02; G06Q 20/40; G06Q 20/227; G06Q 20/12; G06Q 20/105; G06Q 40/00; G06Q 40/04; G06Q 20/3674; G06Q 20/1085; G06Q 20/00; G06Q 20/14; G06Q 99/00; G06Q 20/381; G06Q 30/0601; G06Q 20/325; G06Q 20/40145; G06Q 20/3823
See application file for complete search history.

(56) References Cited

U.S. PATENT DOCUMENTS

| | | | |
|---|---|---|---|
| 7,366,695 B1 | 4/2008 | Allen-Rouman et al. | |
| 8,108,678 B1 | 1/2012 | Boyen | |
| 8,191,766 B2 | 6/2012 | Tomchek et al. | |
| 8,315,952 B2 | 11/2012 | Algiene | |
| 8,719,153 B2 * | 5/2014 | Barry | G06Q 20/10 705/42 |
| 9,160,530 B2 * | 10/2015 | Brown | H04L 9/321 |
| 9,419,951 B1 | 8/2016 | Felsher et al. | |
| 2003/0078884 A1 * | 4/2003 | Bauman | G06Q 20/405 705/39 |
| 2003/0130940 A1 * | 7/2003 | Hansen | G06Q 20/04 705/26.1 |
| 2004/0254891 A1 * | 12/2004 | Blinn | G06Q 20/12 705/67 |
| 2011/0010292 A1 * | 1/2011 | Giordano | G06Q 20/403 705/39 |
| 2012/0096273 A1 | 4/2012 | Campagna et al. | |
| 2012/0239566 A1 * | 9/2012 | Everett | G06Q 20/29 705/41 |
| 2013/0006848 A1 * | 1/2013 | Kuttuva | G06Q 20/3223 705/39 |
| 2013/0060708 A1 | 3/2013 | Oskolkov et al. | |
| 2013/0151418 A1 | 6/2013 | Licciardello et al. | |
| 2013/0212216 A1 * | 8/2013 | Mao | H04N 19/167 709/217 |
| 2016/0203496 A1 | 7/2016 | Guerrero et al. | |
| 2016/0300234 A1 | 10/2016 | Moss-Pultz et al. | |
| 2016/0330027 A1 | 11/2016 | Ebrahimi | |

OTHER PUBLICATIONS

Bionic Buffalo Tech Note #35, "How Encryption and Digital Signatures Work", May 19, 1999. 10 pages.

Chkraborty et al., "Introduction to Signcryption—Technical Report", The University of Birmingham. 17 pages.

Griffin, Phillip H., "Protecting Biometrics Using Signcryption", ID360: The Global Forum on Identity—The Center for Identity—University of Texas at Austin, Apr. 23-24, 2012. 8 pages.

Griffin, Phillip H., "Signcryption Biometric Security", Journal of Cyber Security and Information Systems, Oct. 2012. 4 pages.

Griffin, Phillip, "Signcryption Information Assets", ISSA Journal, Jun. 2012. 5 pages.

Lin et al. "Secure Universal Designated Verifier Identity-Based Signcryption" Security and Communications Networks. 2013.

Seo et al. "Electronic Funds Transfer Protocol Using Domain-Verifiable Signcryption Scheme" Information Security and Cryptolo—ICISC_FFD01999 vol. 1787 of the series Lecture Notes in Computer Science pp. 269-277.

Zheng. "Signcryption and its applications in efficient public key solutions" Information Security; vol. 1396 of the series Lecture Notes in Computer Science pp. 291-312. Section 2.2. 1997.

* cited by examiner

SYSTEMS AND METHODS FOR VALUE TRANSFERS USING SIGNCRYPTION

CROSS-REFERENCE TO RELATED APPLICATIONS

This application is a continuation of U.S. patent application Ser. No. 15/632,631 filed on Jun. 26, 2017, which claims priority to U.S. Provisional Patent Application No. 62/492,530 entitled "SYSTEMS AND METHODS FOR VALUE TRANSFERS USING SIGNCRYPTION," filed May 1, 2017, all of which are incorporated herein by reference in their entireties.

TECHNICAL FIELD

Embodiments of the present disclosure relate generally to the fields of value transfers and commercial transactions.

BACKGROUND

Cryptography serves a number of important roles in the fields of e-communication and e-commerce. For example, a first party sending a message to a second party may wish to ensure that the message remains confidential, and the second party receiving the message may wish to verify the origin authenticity of the message. Accordingly, the first (sending) party may use the principles of cryptography to encrypt the message such that only the second (receiving) party is able to read the message. Additionally, cryptography may be used to prove that the message received by the second party was actually sent by the first party and not by a party impersonating the first party.

Asymmetric encryption is one method of cryptography that is able to satisfy the confidentiality and authentication concerns discussed above. With asymmetric encryption, the sending party and the receiving party each possesses a pair of cryptographic keys: a public key and a private key. For example, each key may be a very large prime number or related to a very large prime number. Each public/private key pair is selected such that a message encrypted with one of the keys can only be decrypted with the other key in the key pair. In general, a public key is made public (i.e., generally accessible and available to the public), while a private key is kept private to just the owner of the public/private key pair.

To preserve a message's confidentiality using asymmetric encryption, the sending party retrieves the public key of the receiving party and encrypts, or "signs," the message to the receiving party using the receiving party's public key. For example, the sending party may input the message ("cleartext") and the receiving party's public key into an encryption algorithm that outputs an encrypted message ("ciphertext"). The sending party then sends the ciphertext to the receiving party. Once the receiving party receives the ciphertext, the receiving party decrypts the message using the receiving party's private key. For example, the receiving party may input the ciphertext and the receiving party's private key into a decryption algorithm that outputs the cleartext (i.e., the unencrypted message). Because only the receiving party has access to the private key that corresponds to the public key the sending party used to encrypt the message, only the receiving party is able to read the message. An intercepting party would be unable to decrypt the message without access to the receiving party's private key.

Additionally, asymmetric encryption may be used to verify a message's origin authenticity. To do this, the sending party encrypts the message using the sending party's private key. For example, the sending party may input the cleartext and the sending party's private key into an encryption algorithm that outputs ciphertext. Alternatively, the sending party may input the cleartext into a hash algorithm that generates a "hash," a smaller mathematical representation of the message. The sending party may then input the hash and the sending party's private key into an encryption algorithm that outputs ciphertext. Regardless, the sending party then sends the ciphertext to the receiving party. Once the receiving party receives the ciphertext, the receiving party can verify that the sending party was actually the party that sent the message by retrieving the sending party's public key and using the sending party's public key to decrypt the message. For example, the receiving party may input the ciphertext and the sending party's public key into a decryption algorithm that outputs the cleartext or the hash. Because the sending party's public key should be able to decrypt anything signed with the sending party's private key, if the receiving party is able to decrypt the ciphertext with the sending party's public key, the receiving party can be confident that the message was signed by the sending party and thus came from the sending party. However, if the receiving party is unable to decrypt the ciphertext with the sending party's public key, the receiving party will know that the message did not come from the sending party or that the message has been tampered with in some way. In other words, by encrypting the message with the sending party's private key, the sending party is able to provide a digital signature for the message.

In traditional encryption schemes, encrypting a message with the receiving party's public key and creating a digital signature with the sending party's private key take place using two separate algorithms. For example, the sending party may first encrypt the cleartext using the sending party's private key to create a digital signature and re-encrypt the output using the receiving party's public key. Additionally, in some configurations, the encryption and digital signature steps may each require a separate key pair. With signcryption, however, a party is able to complete the encryption and digital signature steps using one algorithm and one key pair per party. For example, the sending party may input the cleartext, the sending party's private key (and in some configurations, the sending party's public key), and the receiving party's public key into a signcryption algorithm. The signcryption algorithm then outputs ciphertext that includes the sending party's digital signature and can only be decrypted by the receiving party using the receiving party's private key.

SUMMARY OF THE INVENTION

One embodiment relates to a method of carrying out a value transfer. The method includes receiving, by a computing system of a financial institution, a de-signcrypted value transfer message including terms of a value transfer from an account of a sending party to an account of a merchant, wherein a receiving party desires to make a purchase from the merchant and the value transfer is a payment from the sending party account to the merchant account; and one or more spending limitations comprising at least one limit on the desired purchase, wherein the payment from the sending party account to the merchant account is contingent on the desired purchase meeting the one or more spending limitations. The method also includes verifying, by the financial institution computing system, an authenticity of the de-signcrypted value transfer message using a public key of the sending party and a private key of the financial institution; and dispersing, by the financial institution computing system, funds according to the terms of the value transfer.

Another embodiment relates to a system for carrying out a value transfer. The system includes a processor; and a non-transitory machine readable medium with instructions stored thereon that, when executed by the processor, cause the system to receive a de-signcrypted value transfer message including terms of a value transfer from an account of a sending party to an account of a merchant, wherein a receiving party desires to make a purchase from the merchant and the value transfer is a payment from the sending party account to the merchant account; and one or more spending limitations comprising at least one limit on the desired purchase, wherein the payment from the sending party account to the merchant account is contingent on the desired purchase meeting the one or more spending limitations. The instructions further cause the system to verify an authenticity of the de-signcrypted value transfer message using a public key of the sending party and a private key of a financial institution; and disperse funds according to the terms of the value transfer.

Another embodiment relates to a method of carrying out a value transfer. The method includes receiving, by a computing system of a financial institution, a de-signcrypted value transfer message including terms of a value transfer from an account of a sending party to an account of a merchant, wherein a receiving party desires to make a purchase from the merchant and the value transfer is a payment from the sending party account to the merchant account; and one or more spending limitations comprising at least one limit on the desired purchase, wherein the payment from the sending party account to the merchant account is contingent on the desired purchase meeting the one or more spending limitations. The method further includes receiving, by the financial institution computing system, a transfer verification token; verifying, by the financial institution computing system, an authenticity of the de-signcrypted value transfer message using the transfer verification token; and dispersing, by the financial institution computing system, funds according to the terms of the value transfer.

DETAILED DESCRIPTION

Figure 1:
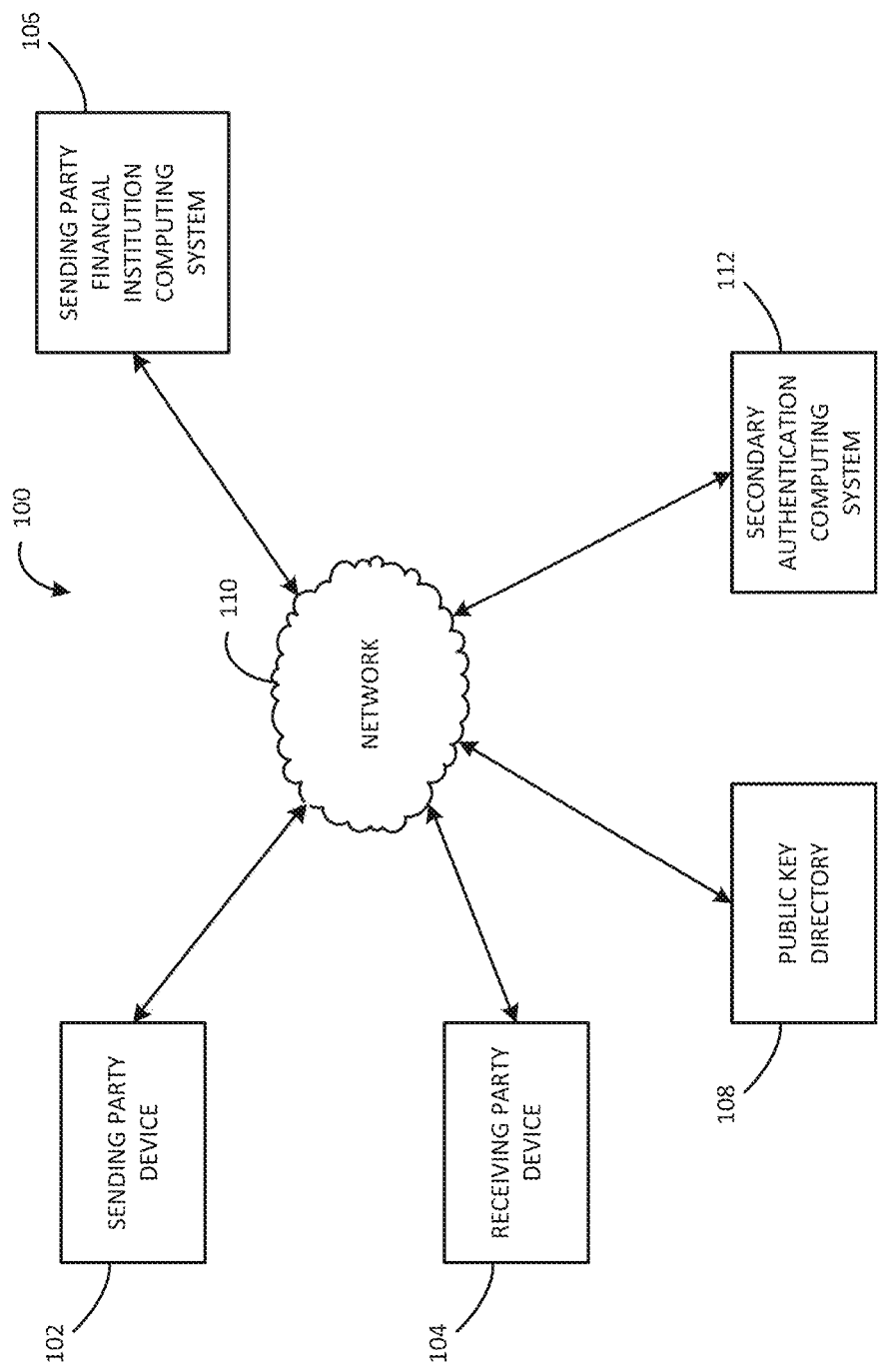
FIG. 1 is an environmental view of a value transfer system, according to one embodiment.

Referring to the Figures generally, various systems, methods, and apparatuses for providing a value transfer, such as a cash delivery, a fund transfer, a payment, etc., using signcryption are described herein. An example implementation may be described as follows. A sender creates a message describing a value transfer to a recipient. The sender signcrypts the message using at least the sender's private key and the recipient's public key. The sender then provides the message to the sender's financial institution, and either the sender or the sender's financial institution provides the signcrypted message to the recipient. The recipient uses at least the recipient's private key and the sender's public key to de-signcrypt the message, and in response to the message being successfully de-signcrypted, the financial institution carries out the value transfer to the recipient in the amount designated in the value transfer message. The recipient then sends a receipt to the sender and/or the sender's financial institution confirming that the value transfer has been carried out. In some arrangements, the receipt may further include a digital signature of the recipient to verify the origin authenticity of the receipt.

The value transfer system described herein offers several technical advantages over conventional methods of providing value transfers. For one, using signcryption to create a value transfer message makes the resulting value transfer non-repudiable. Because only the recipient possesses the private key needed to de-signcrypt the message, only the recipient is able to carry out the value transfer. If an intercepting party receives the message, or if the message is mistakenly sent to the wrong party, the intercepting party or the wrong party will be unable to de-signcrypt the message and therefore will be unable to receive the value transfer. In addition, if the sender creates and sends a value transfer message and the value transfer is subsequently carried out, neither the sender nor the recipient will be able to repudiate sending/receiving the value transfer (i.e., the recipient will be unable to deny receiving the value transfer, except in the unlikely scenario that the recipient's private key is stolen or otherwise compromised).

Another technical advantage of the value transfer system described herein is that using signcryption to send a value transfer helps ensure that only the correct recipient receives the value transfer. Because only the recipient has the recipient's private key needed to de-signcrypt the value transfer message, even if a party that is not the recipient receives the message, that party will not be able to use the message to receive the value transfer. In contrast, current cash delivery services simply require the recipient to provide an ID and a reference number to receive cash sent to the recipient. Both of these items are easier to replicate than a properly stored private key. Additionally, both of these items are confirmed by a human, who may mistakenly verify an incorrect ID or reference number. Accordingly, value (e.g., cash) transfers using the instant value transfer system are more impervious to fraud and human error than current cash delivery systems. Moreover, the value transfer system may include further authentication measures to supplement the signcryption scheme. For example, when the recipient creates and sends the receipt, the recipient may provide a digital signature with the receipt, or even signcrypt the receipt, to further verify that the recipient received the value transfer. As another example, in order for the sender to create the value transfer message and/or for the recipient to redeem the value transfer message, the sender and/or recipient may be required to provide a secondary authentication factor, such as a biometric, a knowledge factor (e.g., a password, a personal identification number ("PIN"), etc.), an identity card, a possession factor (e.g., an RFID or unique serial number from a secure element in the sending party device 102 or the receiving party device 104), and so on.

A further technical advantage of the value transfer system is that it provides flexibility to the sender in making a value transfer and to the recipient in receiving the value transfer. For example, the conventional method of sending cash delivery is for a sender to create and send a check to the recipient. The recipient must then go to a financial institution in order to cash the check. This process may be inconvenient for the parties, particularly if the recipient does not have an account with a financial institution. With the value transfer system, the sender may create and send a cash delivery message to the recipient without having to create a check. The recipient may then pick up the cash delivery at a financial institution without needing to have an account at the financial institution. Thus, the value transfer system provides flexibility to the parties while still ensuring the legitimacy of the value transfer. Additionally, as described herein, the value transfer system provides the additional flexibility of providing for a number of different types of value transfers through the same system.

Referring now to FIG. 1, an environmental view of a value transfer system 100 is shown, according to an example embodiment. As shown, the value transfer system 100 includes a sending party device 102, a receiving party device 104, a sending party financial institution computing system 106, and a public key directory 108 connected by a secure network (e.g., network 110). In some embodiments, as shown in FIG. 1, the system 100 may further include a secondary authentication computing system 112.

The sending party device 102 is a computing device associated with a party creating and sending a value transfer message (i.e., the "sending party") via the value transfer system 100. The sending party may include one or more individuals, business entities, government entities, and agents. In various arrangements, the sending party is a user of one or more financial accounts (e.g., demand deposit accounts, credit or debit card accounts, brokerage accounts, etc.) provided by a source (e.g., issuing) financial institution. In the example embodiment of FIG. 1, the source financial institution is the financial institution associated with the sending party financial institution computing system 106. The sending party creates a value transfer message and sends the value transfer to a "receiving party" via the sending party device 102. In certain embodiments, the value transfer is a cash delivery (i.e., a money transfer to the receiving party that the receiving party picks up in cash), though in other embodiments the sending party may send to the receiving party a funds transfer, a voucher, a gift card, a hard asset (e.g., gold or silver), a commodity (e.g., grain), etc.

The sending party device 102 includes one or more circuits (e.g., one or more processors and non-transitory storage mediums housing one or more logics) that are structured to allow the sending party device 102 to exchange data over the network 110, execute software applications, access websites, generate graphical user interfaces, and perform other operations described herein. The sending party device 102 may include any type of mobile device or any other device that may be used in connection with services provided by a financial institution. For example, the sending party device 102 may include, but is not limited to, a phone (e.g., a smartphone, etc.), a mobile computing device (e.g., a tablet computer, a laptop computer, a personal digital assistant, a portable gaming device, etc.), a stationary computing device (e.g., a desktop computer, an automated teller machine ("ATM"), etc.), a wearable computing device (e.g., a smart watch, smart glasses, a smart bracelet, etc.), and so on. In some embodiments, the sending party device 102 is a personal device of the sending party. In other embodiments, the sending party device 102 is associated with a financial institution or a partner of a financial institution (e.g., the sending party device 102 may be a device, such as an ATM, at a branch of the financial institution of the sending party). The sending party device 102 is described in further detail below with respect to FIG. 3.

The receiving party device 104 is a computing device associated with a party receiving a value transfer message (i.e., the "receiving party") via the value transfer system 100. The receiving party may include one or more individuals, business entities, government entities, and agents. In some arrangements, the receiving party is a user of one or more financial accounts provided by a source (e.g., issuing) financial institution. For example, the source financial institution may be the same financial institution as the financial institution associated with the sending party or may be a different financial institution. In other arrangements, the receiving party is not associated with a financial institution. Regardless, the receiving party receives, via the receiving party device 104, the value transfer message (e.g., a message for a cash delivery) created and sent by the sending party via the sending party device 102.

The receiving party device 104 includes one or more circuits (e.g., one or more processors and non-transitory storage mediums housing one or more logics) that are structured to allow the receiving party device 104 to exchange data over the network 110, execute software applications, access websites, generate graphical user interfaces, and perform other operations described herein. The receiving party device 104 may include any type of mobile device or any other device that may be used in connection with services provided by a financial institution. For example, the receiving party device 104 may include, but is not limited to, a phone (e.g., a smartphone, etc.), a mobile computing device (e.g., a tablet computer, a laptop computer, a personal digital assistant, a portable gaming device, etc.), a stationary computing device (e.g., a desktop computer, an ATM, etc.), a wearable computing device (e.g., a smart watch, smart glasses, a smart bracelet, etc.), and so on. Similar to the sending party device 102, in some embodiments, the receiving party device 104 is a personal device of the receiving party. In other embodiments, the receiving party device 104 is associated with a financial institution or a partner of a financial institution (e.g., the receiving party device may be a device, such as an ATM, at a branch of the financial institution of the sending party or another financial institution). The receiving party device 104 is described in further detail below with respect to FIG. 6.

The sending party financial institution computing system 106 is a computing system associated with or operated by a financial institution (e.g., a bank, a credit card issuer, etc.) or any other entity capable of providing value transfers in connection with a sending party. An embodiment of the sending party financial institution computing system 106 is described in further detail below with respect to FIG. 5.

The public key directory 108 is a key server storing a plurality of public keys associated with a plurality of users.

Computing devices, such as the sending party device 102 and the receiving party device 104, may use the public key directory 108 to look up public keys for various users. For example, in various embodiments, the public key directory 108 includes a database containing the public keys of a variety of parties, including the sending party, the receiving party, and various financial institutions (e.g., the sending party's financial institution, associated with the sending party financial institution computing system 106). In some embodiments, anyone may access this database and retrieve the public key for a particular party. In other embodiments, only those with access to the value transfer system 100 may access the database and retrieve the public key for a particular party, e.g., for the purpose of decrypting a message signed with the party's private key. Accordingly, the public key directory 108 obviates the need for the sending party device 102 and the receiving party device 104 to directly communicate with each other in order to exchange public keys. In practice, the public key directory 108 includes server computer systems, for example, comprising one or more networked computer servers together having at least a processor and non-transitory machine readable media with instructions stored thereon.

As shown in FIG. 1, the value transfer system 100 may further include the secondary authentication computing system 112. The secondary authentication computing system 112 is a computing system structured to authenticate the identity of a sending party and/or a receiving party based on secondary authentication measures (i.e., authentication measures in addition to using signcryption or a digital signature to verify the identity of the sending party and/or the receiving party). In some embodiments, the secondary authentication computing system 112 may be part of the sending party financial institution computing system 106, while in other embodiments, the secondary authentication computing system 112 may be a separate computing system. The secondary authentication computing system 112 is described in further detail below with respect to FIG. 4.

Figure 2A:
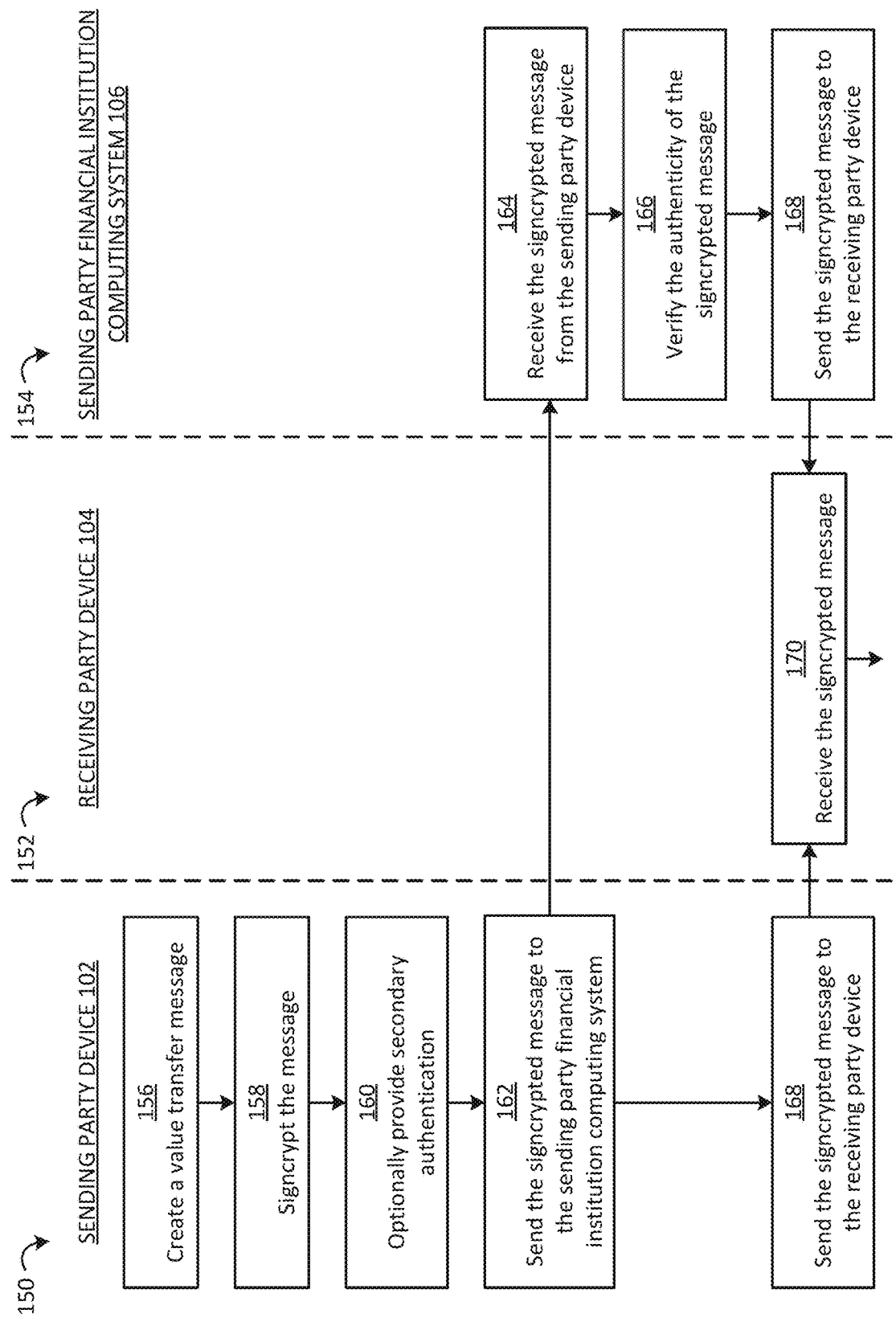
FIGS. 2A-2C are flow diagrams illustrating a method of providing a value transfer, by the system of FIG. 1, according to one embodiment.
Figure 2B:
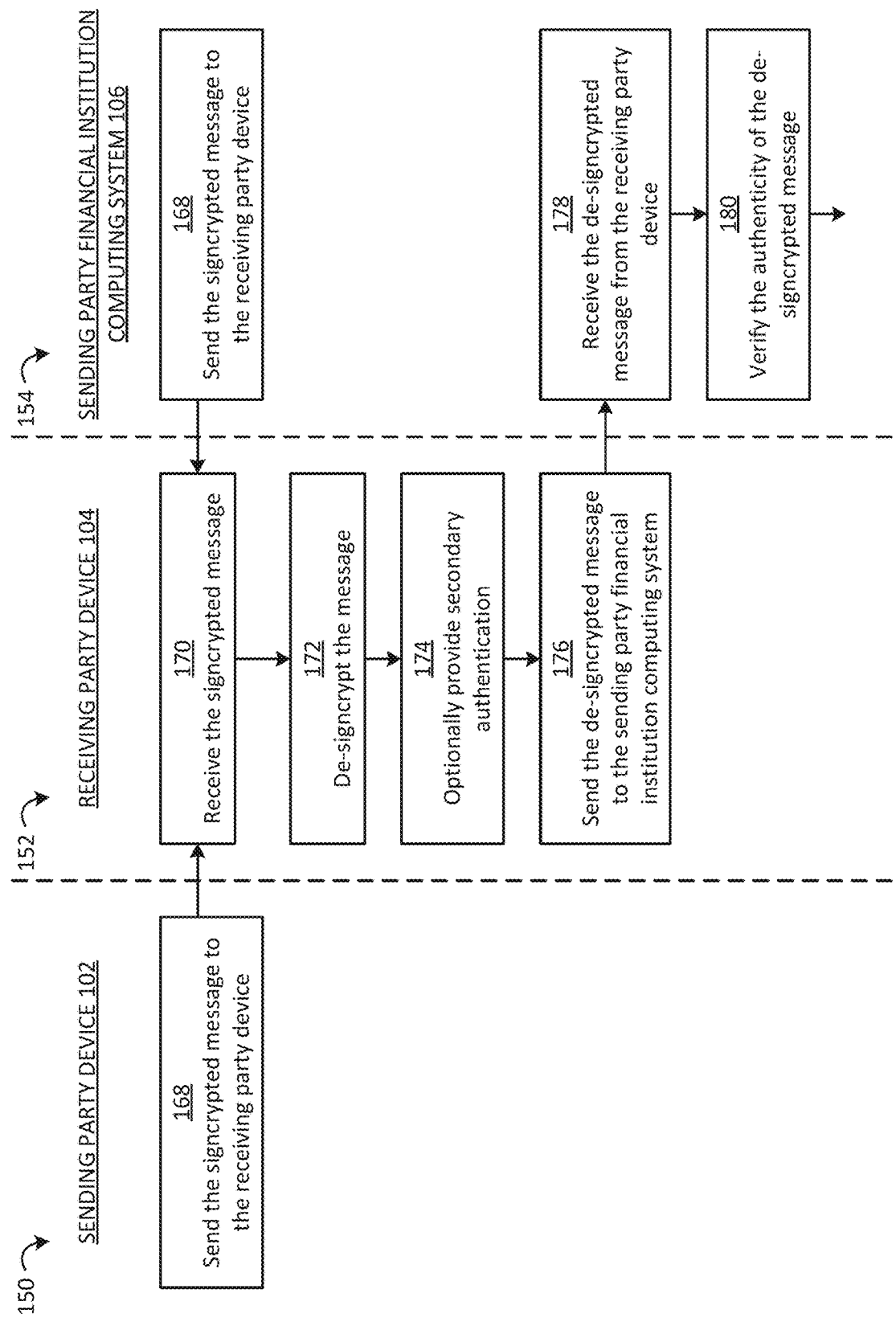
Figure 2C:
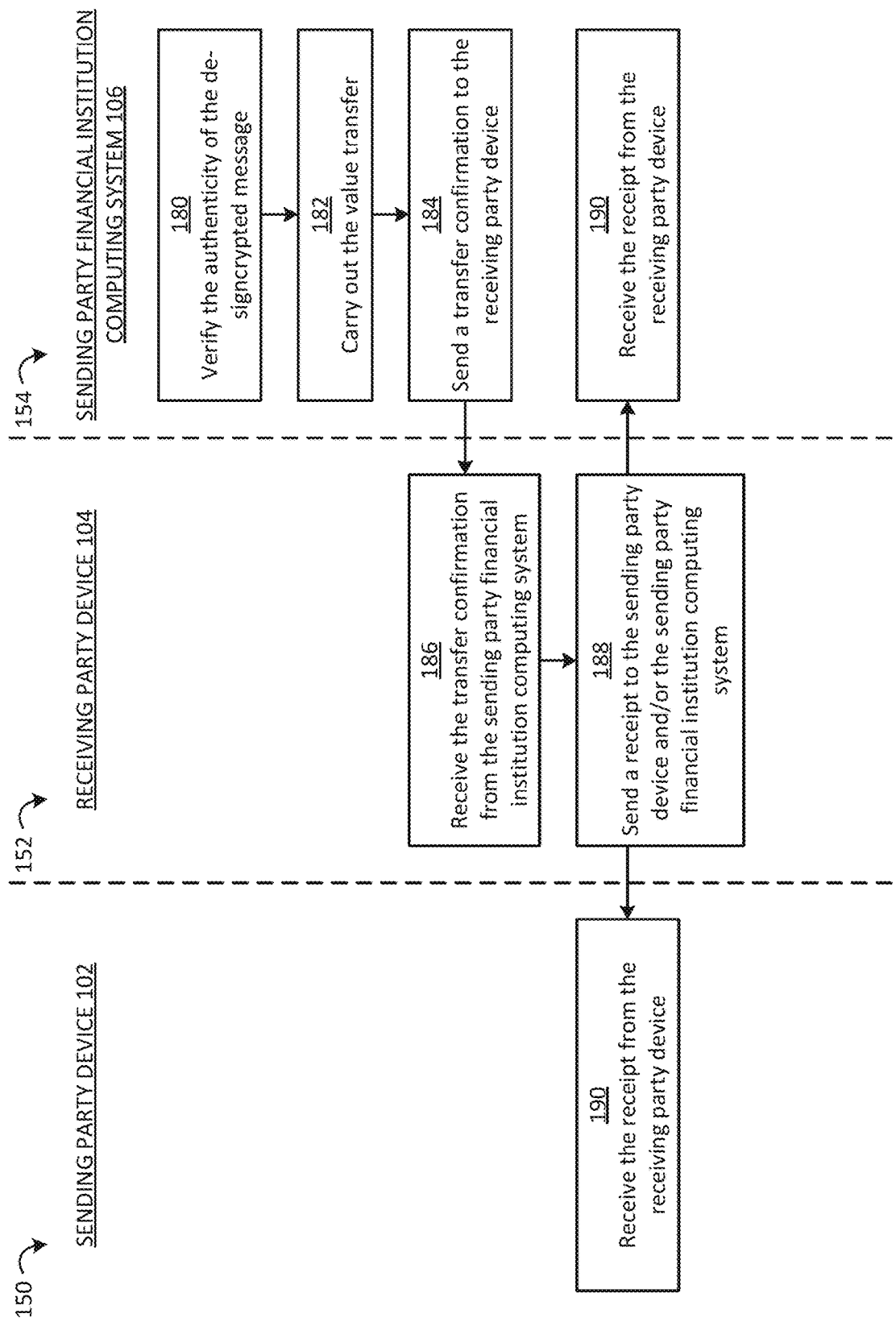

Referring now to FIGS. 2A-2C, flow diagrams of a process of providing a value transfer by the value transfer system 100 are shown, according to an example embodiment. As shown in FIGS. 2A-2C, the overall process of providing a value transfer is shown in three parts: a process 150 of sending the value transfer by the sending party device 102 (i.e., the "sending process"), a process 152 of receiving the value transfer by the receiving party device 104 (i.e., the "receiving process"), and a process 154 of coordinating the value transfer by the sending party financial institution computing system 106 (i.e., the "coordinating process").

Referring first to FIG. 2A, at step 156 of the sending process 150, the sending party creates a value transfer message through the sending party device 102. In certain embodiments, the value transfer message is a cash delivery message that the receiving party may use to receive cash from the sending party. However, the value transfer message may alternatively be a message for a funds transfer (e.g., to a bank or credit card account of the receiving party, to a mobile wallet of the receiving party, etc.), a voucher, a gift card, a coupon, a payment for goods or services, a hard asset (e.g., gold or silver), a commodity (e.g., grain), and so on. The sending party may create the value transfer message, via the sending party device 102, through a plurality of methods. For example, in one embodiment, the sending party device 102 may be a mobile device running an application associated with the sending party's financial institution, and the sending party may create the value transfer message through the application. In another embodiment, the sending party device 102 may be a mobile device, and the sending party may create the value transfer message through a web site for the sending party's financial institution run on a web browser on the mobile device. In another embodiment, the sending party device 102 may be a device at a branch of the sending party's financial institution (e.g., an ATM, a tablet computer at a teller station, etc.). The sending party may accordingly create the value transfer message using software run on the financial institution device. Further methods or devices that may be configured for creating a value transfer message are additionally contemplated by the present application.

In various embodiments, the value transfer message includes basic details about, or "terms" of, the intended value transfer, such as the amount of the transfer, the type of the transfer, an account held by the sending party or a token for the account that the transfer should be provided from, an identification of the receiving party, where the receiving party can pick up or process the value transfer, and so on. In some embodiments, the value transfer message may further include contact information for the sending party (e.g., an email, a phone number, etc.) by which the sending party's financial institution should contact the sending party to confirm the value transfer once it has been carried out. Additionally, in certain embodiments, the sending party may include specific instructions for the value transfer along with the value transfer message or may separately provide specific instructions. In some embodiments, the instructions define conditions for the value transfer. For example, the value transfer message may include an expiration date for the value transfer (i.e., a day by which the receiving party must complete the value transfer, past which the value transfer can no longer be carried out). As another example, the value transfer message may include limitations on what the money may be spent on. Additionally, or alternatively, in other embodiments the value transfer message may be assigned a unique ID by the sending party device 102 or by the sending party financial institution computing system 106.

At step 158 of sending process 150, the sending party device 102 signcrypts the message. In various embodiments, the signcryption is performed according to the general signcryption process discussed above. As such, the sending party has a public and private key pair, with the sending party's public key made available to the general public and the sending party's private key kept private to just the sending party. The receiving party also has a public and private key pair, with the receiving party's public key also made available to the general public and the receiving party's private key kept private to just the receiving party. The sending party device 102 may retrieve the receiving party's public key by communicating with the receiving party device 104, or the sending party device 102 may retrieve the receiving party's public key from the public key directory 108. The sending party device 102 then signcrypts the message by employing an algorithm that uses the sending party's private key (and optionally the sending party's public key) and the receiving party's public key to simultaneously encrypt and digitally sign the message. Accordingly, the algorithm takes the message to be encrypted (i.e., the cleartext) and outputs an encrypted version of the message (i.e., the ciphertext).

For example, in one embodiment, the sending party device 102 may be a smartphone of the sending party, and the sending party's public and private keys may be managed by a digital wallet application or digital wallet circuits on the smartphone. The digital wallet application or circuits may retrieve the receiving party's public key from the public key directory 108, from a digital wallet of the receiving party, or so on. The digital wallet application or circuits then signcrypt the value transfer message created by the sending party using the sending party's key pair and the retrieved public key for the receiving party. As another example, in another embodiment, the sending party device 102 may be a device at a branch of the sending party's financial institution (e.g., an ATM). The sending party may provide the sending party's public and private keys manually to the financial institution device, via a digital wallet application or digital wallet circuits on a mobile device of the sending party (e.g., via RFID), by authorizing the financial institution device to retrieve the keys from a key pair database by providing a password to the device, and so on. The financial institution device then retrieves the receiving party's public key (e.g., through the public key directory 108, through a mobile wallet of the receiving party, etc.) and signcrypts the value transfer message.

Additionally, in some embodiments, the sending party device 102 may further wrap the signcrypted message in a digitally-signed container (e.g., a "SignedData" object or cryptographic message) intended for the sending party financial institution computing system 106. The sending party device 102 may digitally sign the SignedData cryptographic message with at least a public key of the sending party financial institution associated with the sending party financial institution computing system 106 (e.g., such that only the computing system 106 may decrypt the SignedData message using the financial institution's private key), and a private key of the sending party (e.g., such that the computing system 106 may verify the origin authenticity of the SignedData message using the sending party's public key). The sending party device 102 may further include content intended for the sending party financial institution computing system 106 in the SignedData message, such as plain text data instructing the sending party's financial institution that the signcrypted message wrapped in the SignedData message is a value transfer from the sending party to the receiving party. The SignedData message may further include any information needed for processing the value transfer specified in the signcrypted message.

Alternatively, to prove to the sending party financial institution computing system 106 that the sending party device 102 created the value transfer message, the sending party device 102 may include a transfer verification token in the value transfer message. In some embodiments, the transfer verification token may simply be a token including a digital signature of the sending party (e.g., an object that the sending party device 102 digitally signs with the sending party's private key such that another party may verify the original authenticity of the object using the sending party's public key). In other embodiments, the sending party device 102 may signcrypt the transfer verification token using the sending party's public/private key pair and the sending party financial institution's public key. In this case, the sending party financial institution computing system 106 may verify the origin authenticity of the transfer verification token, and thus the value transfer message, using the sending party's public token. Furthermore, the signcryption ensures that only the computing system 106 may de-signcrypt the token, which may prevent tampering with or forging of the transfer verification token. The sending party device 102 may include the transfer verification token in the value transfer message before signcrypting the message, causing the transfer verification token to also be signcrypted. Alternatively, the sending party device 102 may include the transfer verification token in an unsigned portion of the value transfer message structured to carry objects already protected by a digital signature or signcryption.

At step 160 of sending process 150, the sending party optionally provides one or more secondary authentication factors to prove the identity of the sending party. For example, in one embodiment, the sending party may scan in an identity card (e.g., a driver's license, a passport, a student ID, an employee ID, etc.) via the sending party device 102 to provide proof of identity. In another embodiment, the sending party may provide a password via the sending party device 102. In another embodiment, the sending party may provide a biometric (e.g., a fingerprint, a retinal scan, a voice pattern, etc.) via the sending party device 102. In another embodiment, the sending party device 102 may provide a digital identity certificate for the sending party. In a further embodiment, the sending party device 102 is a smartphone of the sending party, and the smartphone provides a unique serial number representing the smartphone from a secure element of the smartphone. In yet another embodiment, the sending party device 102 may be a device at a branch of the sending party's financial institution or another location affiliated with the sending party's financial institution (e.g., a retail store affiliated with the financial institution). The sending party may accordingly be required to provide identification (e.g., a driver's license, a passport, a student ID, an employee ID, etc.) to an employee of the financial institution or the location affiliated with the financial institution (e.g., a bank teller, a cashier, a manager, etc.). After verifying the sending party's identification with the identity card, the employee approves the value transfer message. In this way, the value transfer system 100 may provide two-step verification of the sending party's identity through the signcryption and the secondary authentication factor(s).

At step 162 of sending process 150, the sending party device 102 sends the signcrypted message (e.g., wrapped in the SignedData cryptographic message) to the sending party financial institution computing system 106. In some embodiments, this may include sending the secondary authentication factor(s) provided by the sending party at step 160. In other embodiments, the sending party device 102 may have previously verified the sending party's identity, with the provided secondary authentication factor(s), via the secondary authentication computing system 112. The sending party device 102 may therefore send an indication from the secondary authentication computing system 112 to the sending party financial institution computing system 106, verifying that the sending party's identity has been authenticated with the secondary authentication factor(s).

Furthermore, in some embodiments, the sending party device 102 may notify the receiving party that the value transfer message has been sent to the sending party financial institution computing system 106. For example, the notification may be a text message, an email, an automatic call, or a post to social media informing the receiving party that the value transfer message has been sent to the computing system 106. Alternatively, the value transfer message itself may include a functionality (e.g., specified in a sender application program interface ("API") selectable by the sending party) to notify the receiving party that the value transfer message has been sent to the computing system 106.

As shown in FIG. 2A, at step 164 of coordinating process 154, the sending party financial institution computing system 106 receives the signcrypted message from the sending party device 102. At step 166, the sending party financial institution computing system 106 verifies the origin authenticity of the signcrypted message. For example, in one embodiment, the computing system 106 may retrieve the sending party's public key (e.g., from the public key directory 108) and use the sending party's public key to verify that the message was signcrypted with the sending party's private key, thereby verifying the sending party's identity and the origin authenticity of the message. Similarly, in embodiments where the signcrypted message is wrapped in a SignedData cryptographic message, the computing system 106 may verify the origin authenticity of the signcrypted message by using the sending party's public key to decrypt the SignedData message. Alternatively, in embodiments where the value transfer message includes a transfer verification token in an unsigned portion of the message, the computing system 106 may verify the origin authenticity of the value transfer message by using the sending party's public key to decrypt the transfer verification token.

In another embodiment, the computing system 106 may receive the one or more secondary authentication factors from the sending party device 102 and verify the sending party's identity, and thus the origin authenticity of the message, through the secondary authentication computing system 112. Alternatively, the computing system 106 may receive an indication from the sending party device 102 and/or from the secondary authentication computing system 112 confirming that the identity of the sending party has been verified based on the provided secondary authentication factor(s).

At step 168, either the sending party device 102 or the sending party financial institution computing system 106 sends the signcrypted message to the receiving party device 104. In one embodiment, the sending party financial institution computing system 106 may send the message to the receiving party device 104 after verifying the origin authenticity of the signcrypted message at step 166. For example, after decrypting a SignedData cryptographic message wrapping the signcrypted message with the sending party financial institution's private key and the sending party's public key, the sending party financial institution computing system 106 may send the signcrypted message to the receiving party device 104. In another embodiment, after verifying the origin authenticity of the signcrypted message at step 166, the computing system 106 may send an indication to the sending party device 102 approving the message. The sending party device 102 may then send the message to the receiving party device 104 (e.g., automatically or in response to a command from the sending party). In another embodiment, the sending party device 102 may simultaneously send the signcrypted message to the sending party financial institution computing system 106 and the receiving party device 104. The computing system 106 may then attempt to verify the origin authenticity of the received signcrypted message (step 166) and conduct further processing of the value transfer only if the message is successfully authenticated.

Alternatively, in some embodiments, the signcrypted value transfer message may not be sent to the receiving party device 104. Instead, the sending party financial institution computing system 106 may keep the signcrypted message or send the signcrypted message to a third party, such as a merchant. The computing system 106 may then notify the receiving party (e.g., through an email, a text message, an automatic call, etc. sent to the receiving party device 104) that the value transfer is ready for the receiving party to carry out (e.g., by de-signcrypting the value transfer message with the receiving party's public and private keys and the sending party's public key) at a location associated with the sending party's financial institution or the third party. Additionally, this notification may be configurable by the sending party when the value transfer message is created by the sending party device 102. For example, the sending party may specify when creating the value transfer message that the sending party would like the sending party's financial institution to email the receiving party once the value transfer is ready for the receiving party to carry out.

At step 170 of the receiving process 152, the receiving party device 104 receives the signcrypted message from either the sending party device 102 or the sending party financial institution computing system 106. Referring now to FIG. 2B, at step 172 of the receiving process 152, the receiving party device 104 de-signcrypts the value transfer message. In various embodiments, the receiving party device 104 de-signcrypts the message according to the general de-signcryption process discussed above. Accordingly, the receiving party device 104 receives the sending party's public key by, for example, communicating with the sending party device 102 or by retrieving the sending party's public key from the public key directory 108. The receiving party device 104 then employs an algorithm that uses the receiving party's private key (and, in some embodiments, public key) and the sending party's public key to simultaneously decrypt the message and verify the origin authenticity of the message. As such, the algorithm takes the signcrypted message (i.e., the ciphertext) and outputs the decrypted, original version of the message (i.e., the cleartext).

For example, in one embodiment, the receiving party device 104 may be a smartphone of the receiving party, and the receiving party's public and private keys may be managed by a digital wallet application or digital wallet circuits on the smartphone. The digital wallet application or circuits may retrieve the sending party's public key from the public key directory 108, from a digital wallet of the sending party, or so on. The digital wallet application or circuits may then de-signcrypt the value transfer message using the receiving party's key pair and the retrieved public key for the sending party. As another example, in another embodiment, the receiving party device 104 may be a device at a branch of the sending party's financial institution or a device at the receiving party's financial institution (e.g., an ATM). The receiving party may provide the receiving party's public and private keys manually to the financial institution device, via a digital wallet application or digital wallet circuits on a mobile device of the receiving party (e.g., via RFID), by authorizing the financial institution device to retrieve the keys from a key pair database associated by providing a password to the device, and so on. The financial institution device then retrieves the sending party's public key (e.g., through the public key directory 108, through a mobile wallet of the sending party, etc.) and signcrypts the value transfer message.

At step 174 of the receiving process 152, the receiving party optionally provides one or more secondary authentication factors to prove the identity of the receiving party. For example, in one embodiment, the receiving party may scan in an identity card (e.g., a driver's license, a passport, a student ID, an employee ID, etc.) via the receiving party device 104 to provide proof of identity. In another embodiment, the receiving party may provide a password via the receiving party device 104. In another embodiment, the receiving party may provide a biometric (e.g., a fingerprint, a retinal scan, a voice pattern, etc.) via the receiving party device 104. In another embodiment, the receiving party device 104 may provide a digital identity certificate for the receiving party. In a further embodiment, the receiving party device 104 is a smartphone of the receiving party, and the smartphone provides a unique serial number representing the smartphone from a secure element of the smartphone. In yet another embodiment, the receiving party device 104 may be a device at a branch of the sending party's financial institution, the receiving party's financial institution (i.e., a financial institution with which the receiving party has one or more accounts), or another location affiliated with either financial institution (e.g., a retail store affiliated with either financial institution). The receiving party may accordingly be required to provide identification (e.g., a driver's license, a passport, a student ID, an employee ID, etc.) to an employee of the financial institution or the location affiliated with the financial institution. After verifying the receiving party's identification with the identity card, the employee provides an indication that the receiving party's identification has been verified (e.g., where the identification is sent to the sending party financial institution computing system 106 in step 176). Accordingly, the value transfer system 100 may additionally provide for two-step verification of the receiving party's identity through the signcryption and the secondary authentication factor(s).

At step 176 of the receiving process 152, the receiving party device 104 sends the de-signcrypted message to the sending party financial institution computing system 106. In some embodiments, this may include sending the secondary authentication factor(s) provided by the receiving party at step 174 to the computing system 106. In other embodiments, the receiving party device 104 may have previously verified the sending party's identity, with the provided secondary authentication factor(s), via the secondary authentication computing system 112. The receiving party device 104 may thus send an indication from the secondary authentication computing system 112 to the sending party financial institution computing system 106, verifying that the receiving party's identity has been authenticated with the secondary authentication factor(s).

At step 178 of the coordinating process 154, the sending party financial institution computing system 106 receives the de-signcrypted message from the receiving party device 104. At step 180, the sending party financial institution computing system 106 verifies the origin authenticity of the de-signcrypted message. For example, in one embodiment, the computing system 106 may have access to the original message sent by the sending party, and the computing system 106 may compare the original message to the de-signcrypted message received from the receiving party device 104 to ensure that it is the same message. In another embodiment, the receiving party device 104 may provide a digital signature with the de-signcrypted message (e.g., by signing the de-signcrypted message with the receiving party's private key). The computing system 106 may then use the receiving party's public key to verify that the de-signcrypted message came from the receiving party. Alternatively, in embodiments where the value transfer message includes a transfer verification token, the computing system 106 may verify the that the value transfer message was created by the sending party device 102 by using the sending party's public key to decrypt the transfer verification token.

In another embodiment, the computing system 106 may receive, from the receiving party device 104, the one or more secondary authentication factor(s) gathered for the receiving party at step 174. The computing system 106 may then verify the receiving party's identity, and thus the origin authenticity of the de-signcrypted message, through the secondary authentication computing system 112. Alternatively, the computing system 106 may receive an indication from the receiving party device 104 and/or from the secondary authentication computing system 112 confirming that the identity of the receiving party has been verified based on the provided secondary authentication factor(s).

Referring now to FIG. 2C, at step 182 of the coordinating process 154, the sending party financial institution computing system 106 carries out the value transfer according to the value transfer details included in the value transfer message. Additionally, as described above, the value transfer message or separate communications from the sending party device 102 to the computing system 106 may include more specific instructions for carrying out the value transfer, such as an expiration date, a limit on the types of goods or services the value transfer will cover, and so on. Accordingly, in carrying out the value transfer, the computing system 106 may review information about the requested value transfer to ensure that the requested value transfer satisfies the specific instructions. For example, the specific instructions may include an expiration date for the value transfer. As such, the computing system 106 may verify that the date that the de-signcrypted message was received is before the expiration date before proceeding with the value transfer.

As discussed above, in various embodiments, the value transfer may be a cash disbursement. In one embodiment, the sending party financial institution computing system 106 approves of a cash disbursement to the receiving party at a branch of the sending party's financial institution, the receiving party's financial institution, or another financial institution. In another embodiment, the sending party financial institution computing system 106 approves of a cash disbursement to the receiving party at a location affiliated with the sending party's financial institution, the receiving party's financial institution, or another financial institution. For example, the sending party's financial institution may be affiliated with a retail store, and the computing system 106 may approve of a cash disbursement for the receiving party at a location of the affiliated retail store.

Additionally, as discussed above, in various embodiments the value transfer may be a funds transfer. In one embodiment, the value transfer may be a funds transfer from an account held by the sending party at the sending party's financial institution to an account held by the receiving party at the receiving party's financial institution. For example, when the receiving party provides the de-signcrypted message to the sending party financial institution computing system 106 (step 176), the receiving party may also provide to the computing system 106 an account number or a token of an account number that the computing system 106 should route the funds transfer to. Thus, the signcryption value transfer process may function similarly to a check. In another embodiment, the value transfer may be a funds transfer from an account held by the sending party to a digital wallet of the receiving party.

Further, as discussed above, in various embodiments the value transfer may be a voucher. In these embodiments, the voucher may be provided directly to the receiving party or to a third party, such as a merchant, on the receiving party's behalf. For example, the value transfer message may be directed to a voucher intended for the receiving party because the receiving party won a contest, as part of a promotion by the sending party, as part of a travel insurance payout for the receiving party (i.e., because the receiving party purchased travel insurance from the sending party and the receiving party needs accommodations because the receiving party's flight was cancelled), etc. The receiving party device 104 de-signcrypts the message, as discussed above with respect to step 172. The sending party financial institution computing system 106 then provides a voucher to the receiving party (e.g., via the receiving party device 104) that the receiving party can redeem with the third party (e.g., a retail store, a hotel, etc.), or the computing system 106 sends a payment directly to the third party on behalf of the receiving party.

However, those of skill in the art will appreciate that the aforementioned embodiments are merely examples of value transfers that may occur through the value transfer system 100. This application further encompasses other types of value transfers may be carried out using the value transfer system 100, such as providing a coupon, a gift card, a hard asset, a commodity, and so on.

Additionally, as discussed above, in some embodiments the value transfer message may include contact information for the sending party, such as an email, a phone number, and so on. Accordingly, once the value transfer has been carried out, the sending party financial institution computing system 106 may email the sending party, call the sending party, text the sending party, or otherwise contact the sending party to confirm the value transfer to the sending party.

In various embodiments, the sending party financial institution computing system 106 may further interact with a distributed ledger as part of carrying out the value transfer. It should be understood that the term "distributed ledger" is intended to include any type of distributed ledger, shared ledger, or blockchain. In one embodiment, the computing system 106 may post details about the value transfer on a distributed ledger. For example, as discussed above, the sending party device 102 or the computing system 106 may assign a unique ID to the value transfer. Once the value transfer has been carried out, the computing system 106 may post the unique ID for the transaction to the distributed ledger with an indication that the value transfer has been carried out. As another example, before carrying out a value transfer, the computing system 106 may examine a distributed ledger to verify that the value transfer has not already been carried out by, e.g., the same or a different financial institution.

At step 184 of the coordinating process 154, the sending party financial institution computing system 106 sends a confirmation of the value transfer to the receiving party device 104, and at step 186 of the receiving process 152, the receiving party device 104 receives the transfer confirmation. At step 188 of the receiving process 152, the receiving party device 104 generates and sends a receipt for the value transfer to the sending party device 102 and/or to the sending party financial institution computing system 106. Accordingly, at step 190, the sending party device 102 and/or the sending party financial institution computing system 106 receive the receipt from the receiving party device 104.

In some embodiments, as shown in FIG. 2C, the receiving party device 104 may create and send the receipt in response to receiving the value transfer confirmation from the sending party financial institution computing system 106. In other embodiments, the receiving party device 104 may send the receipt in response to verifying that the receiving party actually received the value transfer. Alternatively, in other embodiments, the receiving party device 104 may create and send the receipt at the time the receiving party device 104 de-signcrypts the value transfer message (e.g., after step 172 shown in FIG. 2B).

In various embodiments, the receipt may include some or all of the information that was signcrypted in the original value transfer message (e.g., extracted from the de-signcrypted message). For example, the receipt may include the identity of the sending party, the amount of the transfer, the type of the value transfer (e.g., cash, funds transfer, voucher, etc.), the unique ID assigned to the value transfer, a time stamp of when the message was sent, and so on. The receipt may, additionally or alternatively, include a time stamp of the value transfer transaction, a time stamp of the creation of the receipt, the location of the value transfer transaction, and so on.

In one embodiment, the receiving party device 104 may digitally sign the receipt with the receiving party's private key. The sending party device 102 and/or the computing system 106 may then verify, using the receiving party's public key, that the receiving party signed the receipt. Thus, by providing a digital signature with the receipt, the receiving party device 104 may provide non-repudiable verification that the receiving party received the value transfer, as only the receiving party should have access to the receiving party's private key and be able to digitally sign the receipt. Additionally, by using the same key pair to sign the receipt as the key pair that was used to signcrypt the value transfer message, the receiving party device 104 further verifies that the correct recipient received the message and the value transfer. In another embodiment, the receiving party device 104 may further include the receiving party's public key certificate in the signed receipt as additional proof of the receiving party's identity. In another embodiment, alternatively or additionally, the receiving party device 104 may signcrypt the receipt to ensure that only the sending party can view the receipt. In yet another embodiment, once the sending party financial institution computing system 106 receives the receipt, the computing system 106 may also sign the receipt and store the receipt in a transaction log.

In some embodiments, in response to receiving the receipt from the receiving party device 104 or in response to making the value transfer, the sending party financial institution computing system 106 may also send a transfer confirmation to the sending party (e.g., via the sending party device 102). The transfer confirmation sent by the computing system 106 may be the receipt created and sent by the receiving party device 104 (e.g., including the digital signature of the receiving party), or the transfer confirmation sent by the computing system 106 may be different from the receipt created and sent by the receiving party device 104. For example, the transfer confirmation may include the amount of the transfer, the type of value transfer, the time of the transfer, and so on. Furthermore, in some embodiments, the sending party financial institution computing system 106 may signcrypt or digitally sign the transfer confirmation with a private key associated with the sending party's financial institution such that the sending party device 102 may verify the origin authenticity of the transfer confirmation using the corresponding public key of the sending party's financial institution.

Figure 3:
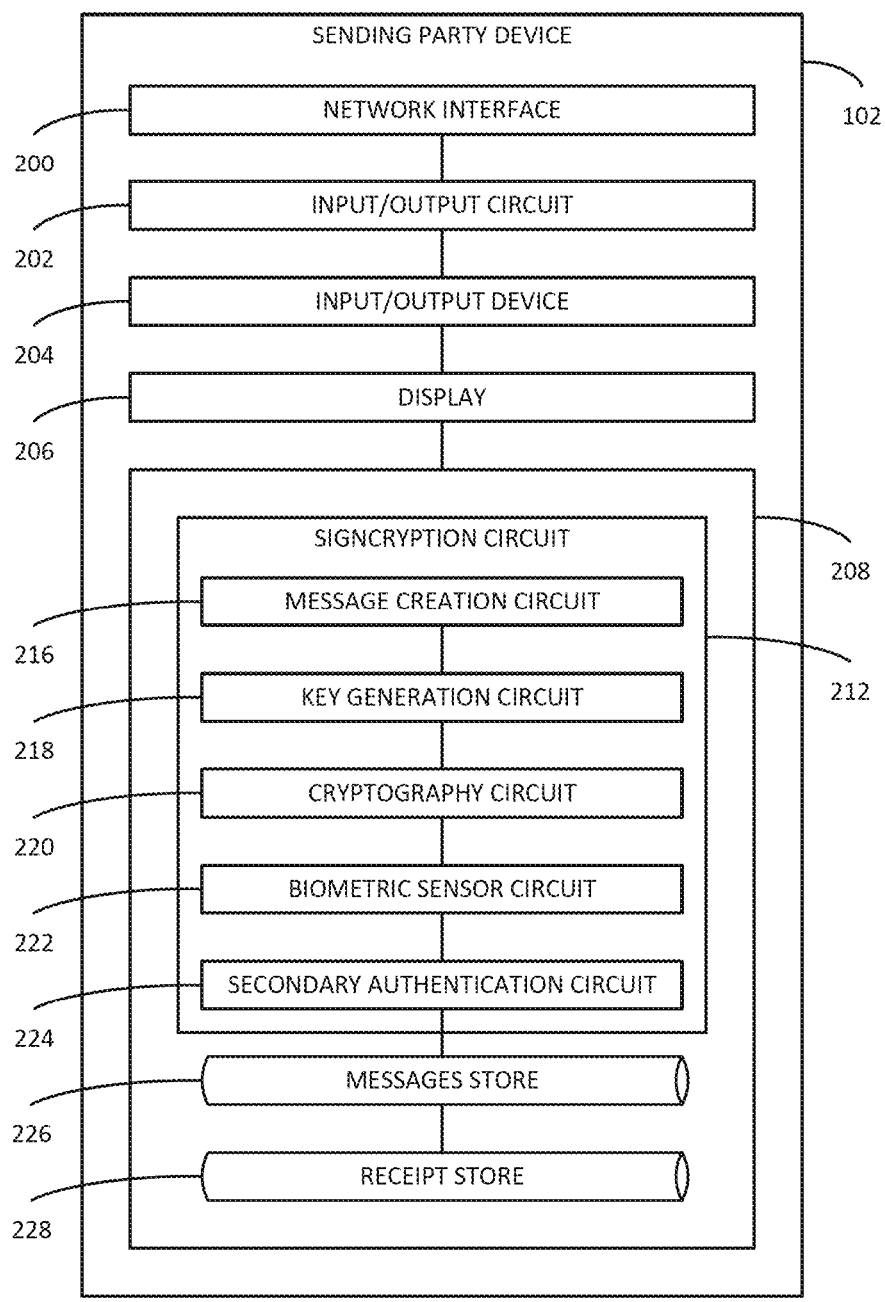
FIG. 3 is a detailed schematic diagram of a sending party device of FIG. 1, according to one embodiment.

Referring now to FIG. 3, a detailed schematic diagram of the sending party device 102 is shown, according to an example embodiment. As shown in FIG. 3, in various embodiments, the sending party device 102 includes a network interface 200, an input/output circuit 202, an input/output device 204, a display 206, and a processing circuit 208.

The network interface 200 of the sending party device 102 is adapted for and configured to establish a communication session via the network 110 with the other components of the value transfer system 100. The input/output circuit 202 is structured to receive and provide communication(s) to the sending party using the sending party device 102. In this regard, the input/output circuit 202 is structured to exchange data, communications, instructions, etc. with input/output components of the sending party device 102. The input/output device 204 may include hardware and associated logics configured to enable the sending party device 102 to exchange information with the sending party. In certain embodiments, an input aspect of the input/output device 204 may allow the user to provide information to the sending party device 102, and an output aspect of the input/output device 204 may allow the sending party to receive information from the sending party device 102.

In various embodiments, the display 206 may be a screen, a touchscreen, a monitor, etc. The sending party device 102 may use the display 206 to communicate information to the sending party (e.g., by displaying the information to the sending party on the display 206) and/or to receive communications from the sending party (e.g., through a keyboard provided on a touchscreen of the display 206). In some embodiments, the display 206 may be incorporated as part of the input/output device 204, while in other embodiments, the display 206 may be separate from the input/output device 204.

As shown in FIG. 3, the sending party device 102 further includes the processing circuit 208, and the processing circuit 208 includes a signcryption circuit 212, a messages store 228, and a receipt store 228. The sending party device 102 uses the signcryption circuit 212 to perform various functions described herein, such as the steps of the sending process 150 as shown in FIGS. 2A-2C. For example, the sending party device 102 may use the signcryption circuit 212 to create, signcrypt, and send value transfer messages. The signcryption circuit 212 may include program logic (i.e., stored executable instructions) configured to implement at least some of the functions described herein. As an example, in one embodiment, the signcryption circuit 212 may implement at least some of the functions described herein as a mobile banking application for a mobile device (e.g., a smartphone, a tablet computer, etc) or a device affiliated with the sending party's financial institution (e.g., an ATM, a tablet computer at a teller station, etc.). In another embodiment, the signcryption circuit 212 may implement at least some of the functions described herein, such as through a program that is provided by the sending party's financial institution and downloaded to the sending party device 102. In another embodiment, the signcryption circuit 212 may implement at least some of the functions described herein through a web browser (e.g., Internet Explorer®, Chrome®, Safari®, etc.) configured to receive and display web pages related to creating a value transfer message and receiving confirmation of the value transfer. In yet other embodiments, the signcryption circuit 212 may implement at least some of the functions described herein through an email application, a text message interface, or another program suitable for communicating with the receiving party device 104 and/or the sending party financial institution computing system 106. For example, the sending party device 102 may receive (e.g., from the computing system 106) and display screens (e.g., on the display 206) via the signcryption circuit 212, the screens including information about a value transfer message, requests to provide secondary authentication information, confirmations of value transfers, and so on.

As shown in FIG. 3, in various embodiments, the signcryption circuit 212 includes a message creation circuit 216, a key generation circuit 218, and a cryptography circuit 220. In some embodiments, as shown in FIG. 3, the signcryption circuit 212 may further include a biometric sensor circuit 222 and/or a secondary authentication circuit 224.

The message creation circuit 216 is structured to allow the sending party to create a value transfer message, as described above with respect to step 156 of FIG. 2A. The value transfer message may be for a cash delivery, a fund transfer, a voucher, a gift card, a coupon, a discount, a payment for goods or services, a hard asset, a commodity, and so on. As described above, the value transfer message created via the message creation circuit 216 defines the terms of the value transfer from an account of the sending party to the receiving party. For example, the value transfer message may include the amount of the value transfer, the type of the value transfer, the recipient (i.e., the receiving party), an account or token of an account held by the sending party that the value transfer should be taken from, where the receiving party can pick up or process the value transfer, and so on. In certain embodiments, the sending party may also include more specific instructions with the value transfer message. For example, the sending party may provide an expiration date for the value transfer, after which the value transfer will no longer be carried out. Once the message is created, the message creation circuit 216 is further structured to send the value transfer message to the sending party financial institution computing system 106 and/or the receiving party device 104, as described above with respect to steps 162 and 168 of FIG. 2A.

The key generation circuit 218 is structured to generate a public/private key pair for the sending party. In one embodiment, the key generation circuit 218 may generate one permanent key pair for the sending party. In another embodiment, the key generation circuit 218 may periodically generate a new key pair for the sending party (e.g., to help protect the sending party in case the sending party's private key is stolen or otherwise compromised). The key generation circuit 218 may provide the sending party's public key to the public key directory 108 such that others may look up the sending party's public key in the public key directory 108. Alternatively, the key generation circuit 218 may receive requests from other users of the value transfer system 100 (e.g., from the receiving party device 104 or the computing system 106) for the sending party's public key and, in response, provide the sending party's public key to the other users.

As shown in FIG. 3, the key generation circuit 218 is provided as part of the sending party device 102. However, in other embodiments, the key generation circuit 218 may not be implemented as part of the sending party device 102 and may instead be part of a different device. For example, the sending party device 102 may be a device at a branch of the sending party's financial institution, such as an ATM, a tablet computer at a teller station, etc. In this situation, the key generation circuit 218 may be implemented on a mobile device of the sending party (e.g., a sending party's smartphone) such that the mobile device creates the public/private key pair for the sending party via the key generation circuit 218 and communicates the key pair to the financial institution device (e.g., by RFID).

The cryptography circuit 220 is structured to signcrypt the value transfer message. In various embodiments, the cryptography circuit 220 signcrypts the value transfer message as described above with respect to step 158 of FIG. 2A. For example, the cryptography circuit 220 may retrieve the public key of the receiving party from the public key directory 108, by communicating with the receiving party device 104, etc. The cryptography circuit 220 may then employ an algorithm that uses the sending party's public and private key pair and the receiving party's public key to simultaneously encrypt and digitally sign the message.

Furthermore, in some embodiments, the cryptography circuit 220 may wrap the signcrypted message in a Signed- Data cryptographic message intended for the sending party financial institution computing system 106. In this case, the cryptography circuit 220 may digitally sign the SignedData cryptographic message with at least the public key of the sending party's financial institution and the private key of the sending party. In this way, the cryptography circuit 220 may ensure that only the computing system 106 may decrypt the SignedData message, and thus retrieve the signcrypted message wrapped therein, because only the computing system 106 has access to the private key of the sending party's financial institution. Furthermore, the sending party financial institution computing system 106 may use the sending party's public key to verify that the sending party device 102 created the signcrypted message and wrapped the signcrypted message in the SignedData message.

Additionally, the cryptography circuit 220 may be structured to create a transfer verification token to include with the value transfer message. In some embodiments, the cryptography circuit 220 may create the transfer verification token as an object including a digital signature of the sending party (e.g., an object signed with the sending party's private key). In other embodiments, the cryptography circuit 220 may signcrypt the transfer verification token using the sending party's public/private key pair and the sending party financial institution's public key. Furthermore, in some embodiments, the cryptography circuit 220 may include the transfer verification token in the value transfer message such that the transfer verification token is signcrypted when the value transfer message is signcrypted. In other embodiments, the cryptography circuit 220 may include the transfer verification token in an unsigned portion of the value transfer message structured to carry objects already protected by a digital signature or signcryption.

Additionally, as described above with respect to step 188 of FIG. 2C, the receipt sent by the receiving party device 104 may be signed with the receiving party's private key. Accordingly, the cryptography circuit 220 may be structured to retrieve and use the receiving party's public key to verify that the receiving party sent the receipt. In embodiments where the sending party financial institution computing system 106 sends a transfer confirmation to the sending party device 102, the cryptography circuit 220 may further be structured to retrieve and use a public key associated with the sending party's financial institution to verify that the computing system 106 sent the transfer confirmation. If the transfer confirmation includes the receipt created by the receiving party device 104, the cryptography circuit 220 may also retrieve and use a public key associated with the receiving party to verify that the receiving party device 104 created the receipt.

As shown in FIG. 3, in certain embodiments, the sending party device 102 may further include a biometric sensor circuit 222 and/or a secondary authentication circuit 224. The biometric sensor circuit 222 is structured to receive and process biometric information for the sending party. For example, the input/output device 204 may include a device for receiving a biometric from the sending party, such as a fingerprint scanner (i.e., for receiving a fingerprint), an eye scanner (i.e., for receiving a retinal scan), or a microphone (i.e., for receiving a voice pattern). The biometric sensor circuit 222 may be coupled to the input/output device 204 such that the biometric sensor circuit 222 receives and processes the biometric (e.g., the fingerprint, the retinal scan, or the voice pattern) from the sending party.

The secondary authentication circuit 224 is structured to receive secondary authentication information from the sending party, as described above with respect to step 160 of FIG. 2A. For example, the secondary authentication circuit 224 may be structured to receive a knowledge factor (e.g., a password, a PIN, etc.), a possession factor (e.g., an RFID or a unique serial number from the sending party device 102 and/or the receiving party device 104), a scan of an identity card of the sending party, a digital identity certificate for the sending party, and so on. Alternatively, or additionally, the secondary authentication circuit 224 may receive biometric information for the sending party from the biometric sensor circuit 222. In some embodiments, the secondary authentication circuit 224 may be structured to verify the received secondary authentication information with, for example, the secondary authentication computing system 112. Upon receiving a positive verification from the secondary authentication computing system 112, the secondary authentication circuit 224 may include an indication that the sending party's identity has been verified in the value transfer message. Upon receiving a negative verification from the secondary authentication computing system 112, the secondary authentication circuit 224 may, for example, provide an error message to the sending party (e.g., by the display 206), re-attempt to verify the sending party's identity (e.g., with a different secondary authentication factor), and so on. In other embodiments, the secondary authentication circuit 224 may be structured to include the received secondary authentication information with the value transfer message such that the sending party financial institution computing system 106 and/or the receiving party device 104 may verify the sending party's identity using the secondary authentication information.

The messages store 226 may be structured to store value transfer messages created and sent via the message creation circuit 216. This may allow, e.g., the sending party to view messages that the sending party has created and have been redeemed by the receiving party, that the sending party has not finished creating, that the sending party has created but have not been approved by the sending party financial institution computing system 106, and so on.

The receipt store 228 may be structured to store one or more receipts that the sending party device 102 has received from a receiving party and/or one or more transfer confirmations that the sending party device 102 has received from the financial institution, as described above with respect to step 190 of FIG. 2C. This may allow, e.g., the sending party to view via the sending party device 102 the value transfers that have been carried out by the receiving party device 104 and the sending party financial institution computing system 106. Additionally, as described above, the receipt sent by the receiving party device 104 and/or the transfer confirmation sent by the sending party financial institution computing system 106 may be signed with the receiving party's private key or the financial institution's private key, respectively, and the cryptography circuit 220 may accordingly use the receiving party's public key to verify the receiving party's digital signature. This verification of the receiving party's identity may be further stored in the receipt store 228 along with the associated receipt.

Figure 4:
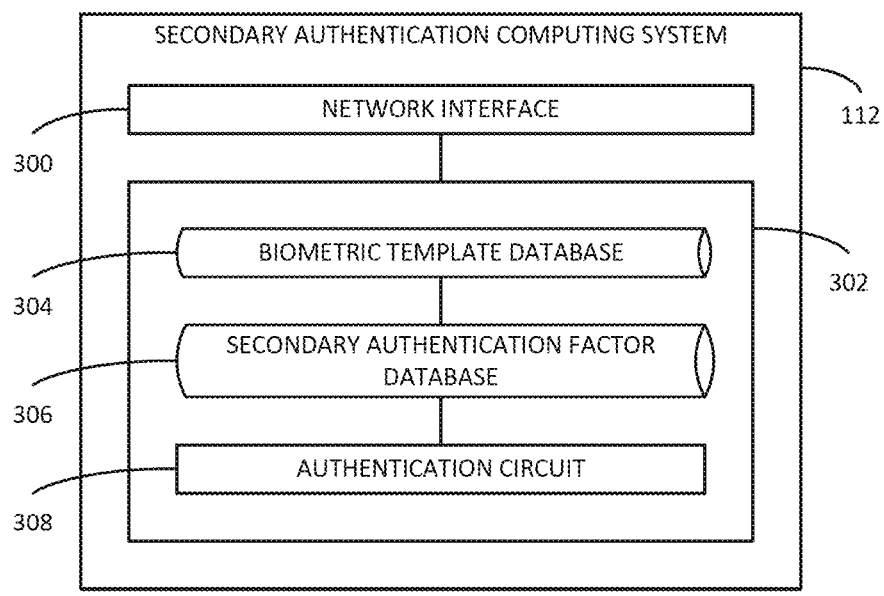
FIG. 4 is a detailed schematic diagram of a secondary authentication computing system of FIG. 1, according to one embodiment.

Referring now to FIG. 4, a detailed schematic diagram of the secondary authentication computing system 112 is shown, according to an example embodiment. As discussed above with respect to FIG. 1, the secondary authentication computing system 112 may be implemented as a separate computing system as shown in FIG. 1, or the secondary authentication computing system 112 may be incorporated into another computing system (e.g., be implemented as part of the sending party financial institution computing system 106). As shown in FIG. 4, in various embodiments, the secondary authentication computing system 112 includes a network interface 300 and a processing circuit 302. The network interface 300 of the secondary authentication computing system 112 is adapted for and configured to establish a communication session via the network 110 with the other components of the value transfer system 100.

As shown in FIG. 4, the processing circuit 302 includes a biometric template database 304, a secondary authentication factor database 306, and an authentication circuit 308. The biometric template database 304 is structured to store biometric reference templates for a plurality of individuals that are sending or receiving parties and/or individuals that are authorized representatives of particular parties. Each biometric reference template is associated with a unique identifier of the individual. For example, the biometric reference template may be one or more fingerprint scans, a retinal scan, a voice recording, and so on. In one embodiment, individuals may enroll and store biometric reference templates in the biometric template database 304 through a financial institution, such as the sending party's financial institution. In another embodiment, individuals may enroll and store biometric reference templates in the biometric template database 304 through a third party.

The secondary authentication factor database 306 is structured to store other secondary authentication factor information for a plurality of parties and/or authorized representatives for the plurality of parties. For example, the secondary authentication factor database may store scans of identity cards, digital identity certificates, passwords, PINs, birthdays, answers to security questions, an RFID identification number or a unique serial number stored in a secure element of the sending party device 102 and/or the receiving party device 104, and other identifying information for a plurality of individuals and parties.

The authentication circuit 308 is structured to authenticate secondary authentication information received from an enquiring device, e.g., the sending party device 102 (as described above with respect to step 160 of FIG. 2A), the receiving party device 104 (as described above with respect to step 174 of FIG. 2B), and/or the sending party financial institution computing system 106 (as described above with respect to steps 166 of FIG. 2A and 180 of FIG. 2B). For example, the authentication circuit 308 may receive from the enquiring device a password, a PIN, a scan of an identity card, a fingerprint, a voice command, and so on. Accordingly, as shown in FIG. 4, the authentication circuit 308 is communicably and operatively coupled to the memory 306 such that the authentication circuit 308 may verify whether the received secondary authentication information matches a biometric reference template stored in the biometric template database 304 or another authentication factor stored in the secondary authentication factor database 306. The authentication circuit 308 then returns the results of the authentication to the enquiring device (e.g., the sending party device 102, the receiving party device 104, and/or the sending party financial institution computing system 106).

Figure 5:
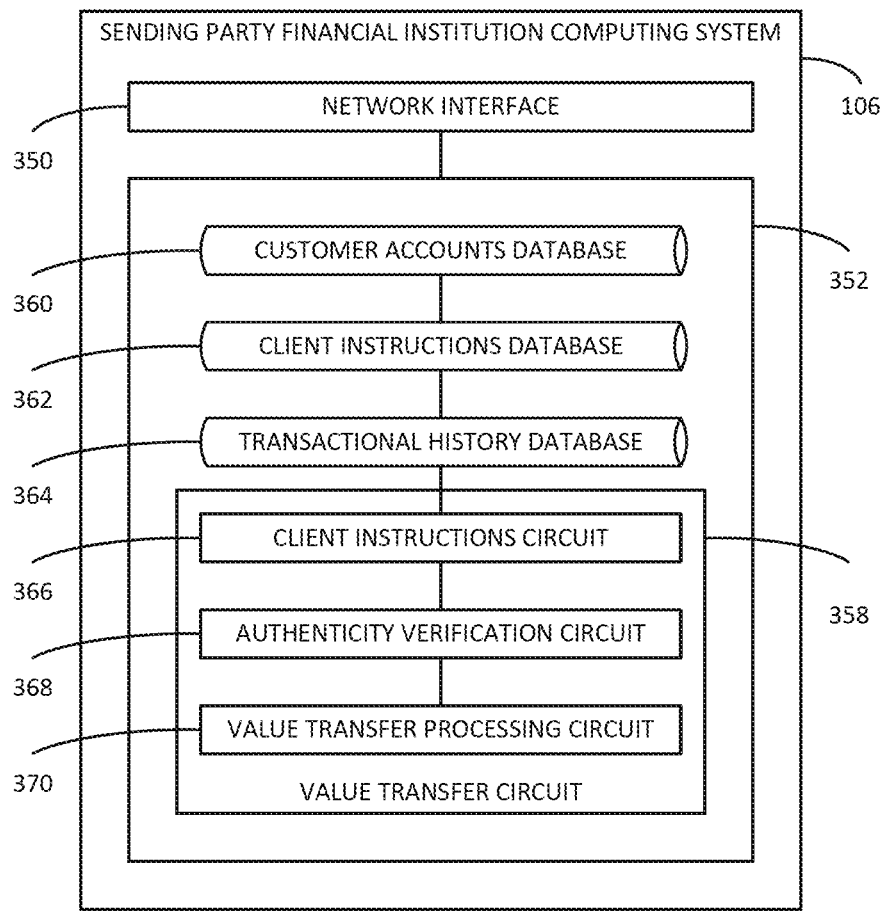
FIG. 5 is a detailed schematic diagram of a sending party financial institution computing system of FIG. 1, according to one embodiment.

Referring now to FIG. 5, a detailed schematic diagram of the sending party financial institution computing system 106 is shown, according to an example embodiment. As shown in FIG. 5, in various embodiments, the sending party financial institution computing system 106 includes a network interface 350 and a processing circuit 352. The network interface 350 of the computing system 106 is adapted for and configured to establish a communication session via the network 110 with the other components of the value transfer system 100.

The processing circuit 352 includes a customer accounts database 360, a client instructions database 362, a transactional history database 364, and a value transfer circuit 358. The customer accounts database 360 may be structured to store information relating to a plurality of accounts (e.g., checking accounts, savings accounts, credit card accounts, etc.) held by a plurality of customers (e.g., including the sending party) at the financial institution associated with the computing system 106. For example, for a given customer with a given account, the customer accounts database 360 may store the customer's biographical information, the customer's contact information, the balance of the account, the account history, and so on. Additionally, in some embodiments, the customer accounts database 360 may store tokens associated with various accounts held by the plurality of customers at the financial institution.

In various embodiments, the computing system 106 may store in the client instructions database 362 client instructions included in value transfer messages or in other communications received from the sending party device 102. For example, as discussed above with respect to the message creation circuit 216 of FIG. 3, the client instructions included in a given value transfer message may include the amount of the transfer, the receiving party, the type of transfer, and so on. The client instructions may also be more specific, such as an expiration date for the value transfer, after which the computing system 106 should not carry out the value transfer even if it receives a valid de-signcrypted message from the receiving party device 104. The client instructions database 362 may be structured to store these client instructions such that, when the computing system 106 receives a valid de-signcrypted message from the receiving party device 104, the computing system 106 may verify with the client instructions database 362 how to proceed with carrying out the value transfer.

The transactional history database 364 may be structured to store information about completed value transfers. In one embodiment, for a given value transfer, the transactional history database 364 may store the amount of the transfer, type of the transfer, the identity of the receiving party, the time of the transfer, and so on. In another embodiment, the transactional history database 364 may simply store extracted content from value transfer messages that have been carried out. In another embodiment, the transactional history database 364 may also store receipts received by the sending party financial institution computing system 106 from the receiving party device 104 (e.g, as described above with respect to step 190 of FIG. 2C). In yet another embodiment, the computing system 106 may digitally sign receipts received from the receiving party device 104, and the transactional history database 364 may store the signed receipts in a transaction log.

The sending party financial institution computing system 106 uses the value transfer circuit 358 to perform various functions described herein, such as the steps of the coordinating process 154 shown in FIGS. 2A-2C. As shown in FIG. 5, in various embodiments, the value transfer circuit 358 includes a client instructions circuit 366, an authenticity verification circuit 368, and a value transfer processing circuit 370. The client instructions circuit 366 is structured to receive value transfer messages from the sending party, as described above with respect to step 164 of FIG. 2A, and de-signcrypted value transfer messages from the receiving party, as described above with respect to step 178 of FIG. 2B. The client instructions circuit 366 may be further structured to receive separate communications from the sending party. The client instructions circuit 366 is further structured to extract and store in the client instructions database 362 the client instructions included in the value transfer messages or other communications (e.g., from non-signcrypted value transfer messages received from the sending party, from the de-signcrypted value transfer messages received from the receiving party, from other instructional messages received from the sending party, etc.).

The authenticity verification circuit 368 is structured to determine the origin authenticity of signcrypted messages received from the sending party device 102 (step 164 of FIG. 2A) and the origin authenticity of de-signcrypted messages from the receiving party device 104 (step 178 of FIG. 2B), as described above with respect to step 166 of FIG. 2A and step 180 of FIG. 2B. In some embodiments, if the message is signcrypted or otherwise signed with a private key, the authenticity verification circuit 368 may verify the origin authenticity of the message using the corresponding public key. Additionally, in some embodiments, the authenticity verification circuit 368 may determine the origin authenticity of a received message through a public key certificate included with the message.

In other embodiments, the authenticity verification circuit 368 may determine the origin authenticity of received messages by verifying the identity of the party sending the message to the computing system 106 with secondary authentication information included with the message. For example, the computing system 106 may receive a fingerprint from the party sending the message to the computing system 106. The computing system 106 may accordingly verify with the secondary authentication computing system 112 that the fingerprint matches a biometric template stored for the party (e.g., in the biometric template database 304). As another example, the computing system 106 may receive a PIN from the party sending the message to the computing system 106. The computing system 106 may then verify with the secondary authentication computing system 112 that the PIN matches a stored PIN associated with the party (e.g., in the secondary authentication factor database 306). Alternatively, the authenticity verification circuit 368 may receive from the device sending the message to the computing system 106 (e.g., the sending party device 102, the receiving party device 104, etc.) an indication that the device has verified the identity of the party sending the message (e.g., with the secondary authentication computing system 112).

In still other embodiments, the computing system 106 may employ additional or alternative methods of origin authenticity verification. For example, in one embodiment, the computing system 106 may receive from the sending party device 102 (e.g., in step 164 of FIG. 2A) a signcrypted version and a non-signcrypted version of the value transfer message. Accordingly, when the computing system 106 receives the de-signcrypted message from the receiving party device 104 (e.g., in step 178 of FIG. 2B), the computing system 106 may verify that the contents of the de-signcrypted message match the contents of the original message sent by the sending party device 102.

Furthermore, in embodiments where the signcrypted message is wrapped in a SignedData cryptographic message, the authenticity verification circuit 368 may use the sending party's public key to verify that sending party device 102 created the SignedData message and, presumably, created the signcrypted message wrapped therein. The authenticity verification circuit 368 may further retrieve the signcrypted message by decrypting the SignedData cryptographic message wrapping the signcrypted message with the sending party financial institution's private key. Alternatively, or additionally, in embodiments where the value transfer message includes a transfer verification token, the authenticity verification circuit 368 may use the sending party's public key to verify that the sending party device 102 created the token and, presumably, the value transfer message. For example, if the transfer verification token is signcrypted, the computing system 106 may de-signcrypt the token using the public/private key pair of the sending party's financial institution and the public key of the sending party.

Additionally, in various embodiments, in response to verifying the origin authenticity of a signcrypted value transfer message received from the sending party device 102, the authenticity verification circuit 368 may be structured to send the signcrypted value transfer message to the receiving party device 104, as described above with respect to step 168 of FIG. 2A. Before doing so, the authenticity verification circuit 368 may assign a unique ID to the value transfer message. Moreover, in various embodiments, the authenticity verification circuit 368 may be structured to verify the origin authenticity of receipts received from the sending party device 102, for example, through a digital signature or a public key certificate included with the receipt.

The value transfer processing circuit 370 is structured to, in response to the authenticity verification circuit 368 verifying the origin authenticity of a de-signcrypted message, process the value transfer from the sending party to the receiving party, as authorized by the value transfer message and/or by the client instructions stored in the client instructions database 362. As described above with respect to step 182 of FIG. 2C, the value transfer may be a cash disbursement, a funds transfer, a voucher, and so on. In making the value transfer, the value transfer processing circuit 370 may access information about the sending party's account in the customer accounts database 360 and update the balance of the sending party's account in the customer accounts database 360. For example, if the value transfer is a cash disbursement, the value transfer processing circuit 370 may be structured to send an authorization to a cash transfer device (e.g., an ATM), an employee disbursing the cash, etc., such that the receiving party may receive the cash. The value transfer processing circuit 370 may then subtract the amount of the cash transfer from the recorded balance for the sending party's account in the customer accounts database 360.

In various embodiments, as part of carrying out the value transfer, the value transfer processing circuit 370 may further be structured to connect, by the network 110, with other financial institutions or third parties (e.g., merchants). For example, if the value transfer is a funds transfer to an account of the receiving party at a second financial institution, the value transfer processing circuit 370 may connect via the network 110 with the receiving party financial institution's computing system to transfer the funds from an account of the sending party to the account of the receiving party. As another example, if the value transfer is a voucher for the receiving party to receive goods or services from a third party, the value transfer processing circuit 370 may connect via the network 110 with a computing system of the third party. The third party computing system may send to the sending party financial institution computing system 106 the cost of the item(s) or service(s) for which the receiving party is redeeming the voucher. In response, the value transfer processing circuit 370 may transfer the amount of the cost from the sending party's account to the third party's computing system. Alternatively, the value transfer processing circuit 370 may connect, via the network 110, with the computing system of the third party's financial institution and transfer the amount of the cost from the sending party's account to an account for the third party at the third party's financial institution.

In certain embodiments, as discussed above with respect to step 182 of FIG. 2C, the value transfer processing circuit 370 may be structured to carry out the value transfer according to specific instructions stored in the client instructions database 362. For example, the value transfer message may include an expiration date for the value transfer. Accordingly, before carrying out the value transfer, the value transfer processing circuit 370 may verify that the current date is not past the expiration date. If the current date is past the expiration date, the value transfer processing circuit 370 may deny the value transfer and may, for example, send a message indicating the same to the receiving party device 104.

Additionally, in certain embodiments, before carrying out the value transfer, the value transfer processing circuit 370 may verify that the value transfer has not previously been carried out. For example, the value transfer processing circuit 370 may consult the transactional history database 364 to ensure that the same transfer has not already been executed. As another example, the value transfer processing circuit 370 may determine whether a unique ID associated with the value transfer message to be carried out has been posted on a distributed ledger as completed.

In various embodiments, once the value transfer has been processed, the value transfer processing circuit 370 is further structured to send a transfer confirmation to the receiving party device 104, as described above with respect to step 184 of FIG. 2C. Additionally, the value transfer processing circuit 370 may send a transfer confirmation to the sending party. For example, as discussed above, the value transfer message may include contact information for the sending party, such as an email, a phone number, etc., by which the computing system 106 is to confirm the value transfer to the sending party. As such, the value transfer processing circuit 370 may email the sending party, call the sending party, text the sending party, etc. with a confirmation of the value transfer once it has been carried out.

Moreover, in various embodiments, the value transfer processing circuit 370 is structured to store details about the value transfer in the transactional history database 364. For example, the value transfer processing circuit 370 may store the entire extracted content of the value transfer message in the transactional history database 364. Alternatively, or additionally, the value transfer processing circuit 370 may store certain content relating to the value transfer, such as the date and time of the transfer, the amount of the transfer, the type of transfer, the identity of the receiving party, and so on. In some embodiments, the value transfer processing circuit 370 may be further structured to receive receipts sent by the receiving party device 104 (e.g., as described above with respect to step 190 of FIG. 2C) and store the receipts in a log in the transactional history database 364. In doing so, the value transfer processing circuit 370 may also digitally sign the receipts to verify that the computing system 106 has received and reviewed them. Furthermore, in some embodiments, the value transfer processing circuit 370 may further store details about the value transfer (e.g., a unique ID associated with the value transfer message with a "confirmed" status) as a hash on a blockchain, which may further enhance the non-repudiability of the value transfer.

Figure 6:
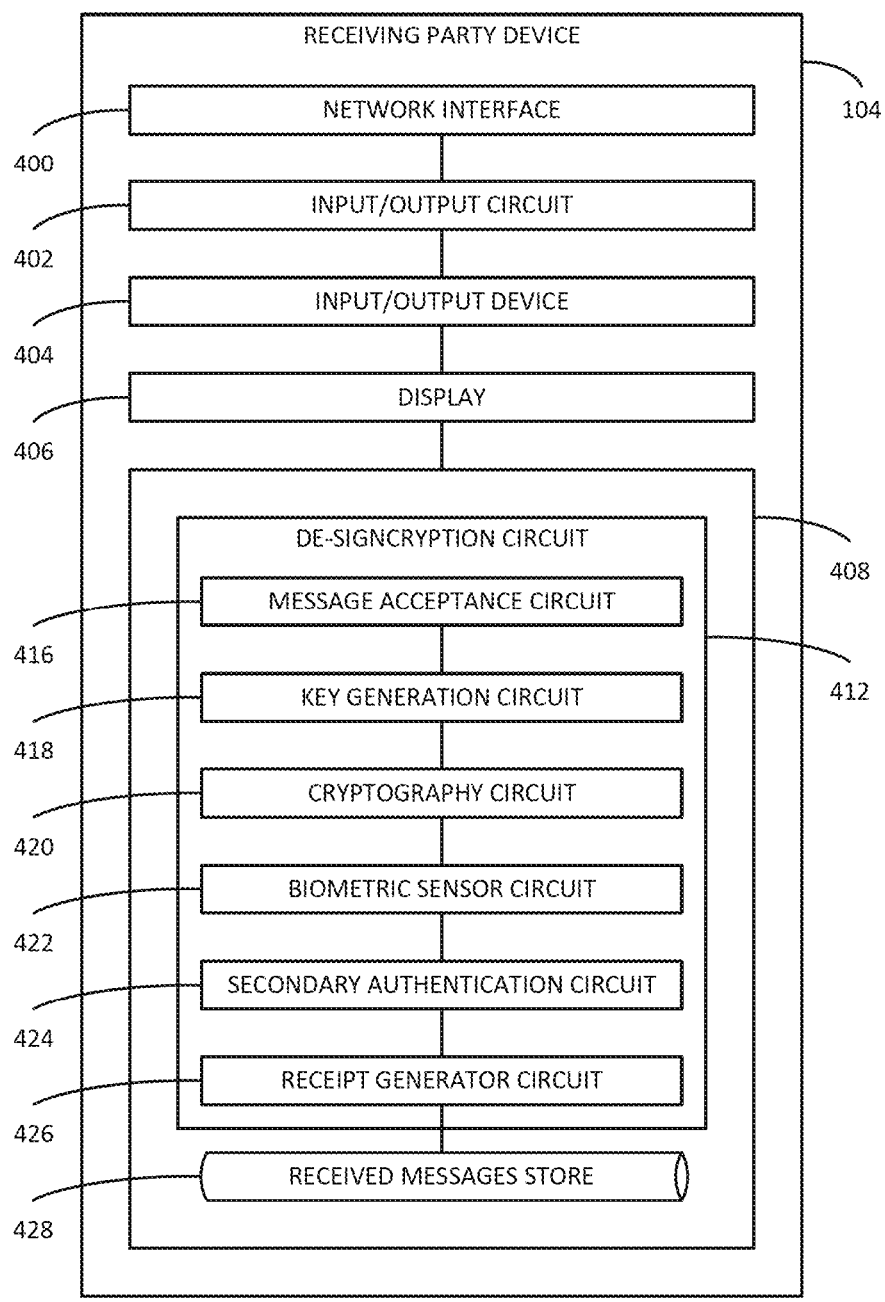
FIG. 6 is a detailed schematic diagram of a receiving party device of FIG. 1, according to one embodiment.

Referring now to FIG. 6, a detailed schematic diagram of the receiving party device 104 is shown, according to an example embodiment. As shown in FIG. 6, in various embodiments, the receiving party device 104 includes a network interface 400, an input/output circuit 402, an input/output device 404, a display 406, and a processing circuit 408.

The network interface 400 of the receiving party device 104 is adapted for and configured to establish a communication session via the network 110 with the other components of the value transfer system 100. The input/output circuit 402 is structured to receive and provide communication(s) to the receiving party using the receiving party device 104. In this regard, the input/output circuit 402 is structured to exchange data, communications, instructions, etc. with input/output components of the receiving party device 104. The input/output device 404 may include hardware and associated logics configured to enable the receiving party device 104 to exchange information with the receiving party. In certain embodiments, an input aspect of the input/output device 404 may allow the user to provide information to the receiving party device 104, and an output aspect of the input/output device 404 may allow the receiving party to receive information from the receiving party device 104.

In various embodiments, the display 406 may be a screen, a touchscreen, a monitor, etc. The receiving party device 104 may use the display 406 to communicate information to the receiving party (e.g., by displaying the information to the receiving party on the display 406) and/or to receive communications from the receiving party (e.g., through a keyboard provided on a touchscreen of the display 406). In some embodiments, the display 406 may be incorporated as part of the input/output device 404, while in other embodiments, the display 406 may be separate from the input/output device 404.

As shown in FIG. 6, the processing circuit 408 includes a de-signcryption circuit 412 and a received messages store 428. The receiving party device 104 uses the de-signcryption circuit 412 to perform various functions described herein, such as the steps of the receiving process 152 shown in FIGS. 2A-2C. For example, the receiving party device 104 may use the de-signcryption circuit 412 to receive and de-signcrypt value transfer messages, use the de-signcrypted value transfer messages to facilitate value transfers to the receiving party, and generate and send value transfer receipts. The de-signcryption circuit 412 may include program logic (i.e., stored executable instructions) configured to implement at least some of the functions described herein. As an example, in one embodiment, the de-signcryption circuit 412 may implement the functions described herein as a banking application for a mobile device (e.g., a smartphone, a tablet computer, etc) or a device affiliated with the sending party's financial institution (e.g., an ATM, a tablet computer at a teller station, etc.). The banking application implemented through the de-signcryption circuit 412 may the same as a banking application implemented through the signcryption circuit 212 of the sending party device 102. For instance, the sending party device 102 and the receiving party device 104 may both download the same banking application from an application store or application database, the application capable of performing both the sending process 150 and the receiving process 152. Alternatively, the mobile banking applications may be different. In another embodiment, the de-signcryption circuit 412 may implement at least some of the functions described herein as through a program that is provided by the sending party's financial institution and downloaded to the receiving party device 104. In another embodiment, the de-signcryption circuit 412 may implement at least some of the functions described herein through a web browser (e.g., Internet Explorer®, Chrome®, Safari®, etc.) configured to receive and display web pages from the sending party device 102 and/or the computing system 106. In yet other embodiments, the de-signcryption circuit 412 may implement at least some of the functions described herein through an email application, a text message interface, or another program suitable for communicating with the sending party device 102 and/or the sending party financial institution computing system 106. For example, the receiving party device 104 may receive (e.g., from the computing system 106) and display screens (e.g., on the display 406) via the de-signcryption circuit 412, the screens including information about a received signcrypted message, requests to provide secondary authentication information, confirmations of value transfers, and so on.

As shown in FIG. 6, in various embodiments, the signcryption circuit 412 includes a message acceptance circuit 416, a key generation circuit 418, a cryptography circuit 420, and a receipt generator circuit 426. In some embodiments, as shown in FIG. 6, the de-signcryption circuit 412 may further include a biometric sensor circuit 422 and/or a secondary authentication circuit 424.

The message acceptance circuit 416 is structured to receive value transfer messages sent from sending parties, such as by the sending party device 102, as described above with respect to step 170 of FIG. 2A. The message acceptance circuit 416 is further structured to store the received value transfer messages in a received messages store 428 of the memory 414, as described in further detail below.

The key generation circuit 418 is structured to generate a public/private key pair for the receiving party and may be structured similarly to the key generation circuit 218 of the sending party device 102. Accordingly, in one embodiment, the key generation circuit 418 may generate one permanent key pair for the receiving party. In another embodiment, the key generation circuit 418 may periodically generate a new key pair for the receiving party (e.g., to help protect the receiving party in case the receiving party's private key is stolen or otherwise compromised). The key generation circuit 418 may provide the receiving party's public key to the public key directory 108 such that others may look up the receiving party's public key in the public key directory 108. Alternatively, the key generation circuit 418 may receive requests from other users of the value transfer system 100 (e.g., from the sending party device 102 or the computing system 106) for the receiving party's public key and, in response, send the public key to the other users.

As shown in FIG. 6, the key generation circuit 418 is provided as part of the receiving party device 104. However, in other embodiments, the key generation circuit 418 may not be implemented as part of the receiving party device 104 and may instead be part of a different device. For example, the receiving party device 104 may be a device at a branch of a financial institution of either the sending party or the receiving party. For instance, the receiving party device 104 may be an ATM, a tablet computer at a teller station, etc. In this situation, the key generation circuit 418 may be implemented on a mobile device of the receiving party (e.g., a receiving party's smartphone), such that the mobile device creates the public/private key pair for the receiving party via the key generation circuit 418 and communicates the key pair to the financial institution device (e.g., by RFID).

The cryptography circuit 420 is structured to de-signcrypt a value transfer message received from the sending party device 102. In various embodiments, the cryptography circuit 420 de-signcrypts the value transfer message as described above with respect to step 172 of FIG. 2B. For example, the cryptography circuit 420 may retrieve the public key of the sending party from the public key directory 108, by communicating with the sending party device 102, etc. The cryptography circuit 420 may then employ an algorithm that uses the receiving party's public and private key pair and the sending party's public key to simultaneously decrypt the value transfer message and verify the origin authenticity of the message.

As shown in FIG. 6, in certain embodiments, the receiving party device 104 may further include a biometric sensor circuit 422 and/or a secondary authentication circuit 424. The biometric sensor circuit 422 may be structured similarly to the biometric sensor circuit 222 of the sending party device 102. Accordingly, in various embodiments, the biometric sensor circuit 422 is structured to receive and process biometric information for the receiving party. For example, as with the biometric sensor circuit 222, the input/output device 404 may include a device for receiving a biometric from the receiving party. The biometric sensor circuit 422 may be coupled to the input/output device 404 such that the biometric sensor circuit 422 receives and processes the biometric from the receiving party.

The secondary authentication circuit 424 is structured to receive secondary authentication information for the sending party, as described above with respect to step 174 of FIG. 2B, and may be structured similarly to the secondary authentication circuit 224 of the sending party device 102. Accordingly, in various embodiments and similar to the secondary authentication circuit 224, the secondary authentication circuit 424 may receive secondary authentication information from the sending party or via the biometric sensor circuit 422. In some embodiments, the secondary authentication circuit 424 may be structured to verify the received secondary authentication information with, for example, the secondary authentication computing system 112. In other embodiments, the secondary authentication circuit 424 may be structured to include the received secondary authentication information with the de-signcrypted value transfer message such that the sending party financial institution computing system 106 may verify the receiving party's identity.

In certain embodiments, if the receiving party has lost the receiving party's key pair, the receiving party may still be able to prove the receiving party's identity and thus receive the value transfer by providing one or more secondary authentication factors. For example, if the receiving party is able to de-signcrypt the message, the sending party financial institution computing system 106 may automatically carry out the value transfer upon receipt of the de-signcrypted message. However, if the receiving party has lost the key pair, the computing system 106 may require that the receiving party provide two or more secondary authentication factors via the biometric sensor circuit 422 and/or the secondary authentication circuit 424 before the computing system 106 will carry out the value transfer.

As shown in FIG. 6, the de-signcryption circuit 412 further includes a receipt generator circuit 426. The receipt generator circuit 426 is structured to create and send a receipt to the sending party device 102 and/or the sending party financial institution computing system 106, as described above with respect to step 188 of FIG. 2C. In some embodiments, the receipt generator circuit 426 may create and send the receipt in response to receiving a value transfer confirmation from the sending party financial institution computing system 106. In other embodiments, the receipt generator circuit 426 may create and send the receipt in response to the receiving party device 104 confirming that the value transfer has been actually carried out. For example, the receipt generator circuit 426 may create and send the receipt in response to an email received from the receiving party's financial institution confirming a funds transfer, in response to the receiving party device 104 disbursing cash, in response to receiving an indication from an ATM that the cash disbursement has been made, etc. In still other embodiments, the receipt generator circuit 426 may create and send the receipt at the time the value transfer message is de-signcrypted. As described above with respect to step 188 of FIG. 2C, the receipt generator circuit 426 may include in the receipt some or all of the information from the original signcrypted value transfer message or may include in the receipt additional or different information from the original message, such as the time stamp of the receipt. The receipt generator circuit 426 may also create a digital signature for the receipt (e.g., by encrypting at least part of the receipt with the receiving party's private key) or signcrypt the receipt.

As shown in FIG. 6, the memory 414 is communicably and operatively coupled with the de-signcryption circuit 412 such that the memory 414 may store information relating to the functions performed by the de-signcryption circuit 412. As shown, the memory 414 includes at least a received messages store 428. The received messages store 428 is structured to store value transfer messages received by the message acceptance circuit 416. This may allow, e.g., the receiving party to view the received value transfer messages that the receiving party has redeemed with the computing system 106 for the value transfer, that the receiving party has not redeemed, and so on. Additionally, the received messages store 428 may be structured to store receipts generated by the receipt generator circuit 426, where the receipts are associated with their respective value transfer messages in the received messages store 428.

Figure 7:
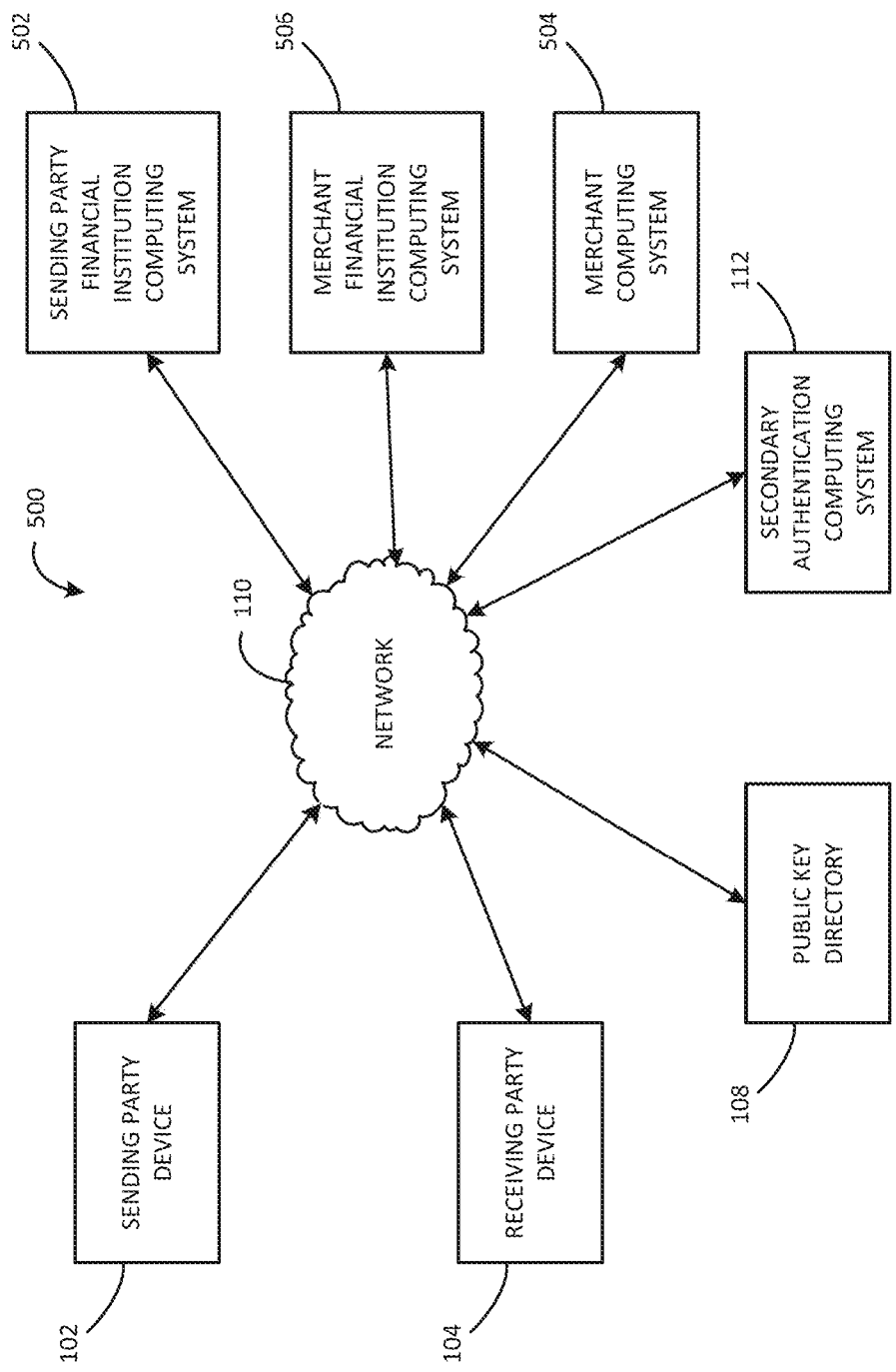
FIG. 7 is an environmental view of a value transfer system, according to a second embodiment.

Referring now to FIG. 7, an environmental view of a value transfer system 500 is shown, according to a second example embodiment. As shown, the value transfer system 500 includes the sending party device 102, the receiving party device 104, the public key directory 108, and, in some embodiments, the secondary authentication computing system 112. Additionally, as shown in FIG. 7, the value transfer system 500 includes a sending party financial institution computing system 502, according to a second example embodiment. The value transfer system 500 also includes a merchant computing system 504 and a merchant financial institution computing system 506. As with the value transfer system 100, the sending party device 102, the receiving party device 104, the public key directory 108, the secondary authentication computing system 112, the sending party financial institution computing system 502, the merchant computing system 504, and the merchant financial institution computing system 506 are connected by a secure network (e.g., network 110).

The sending party device 102, the receiving party device 104, the public key directory 108, and the secondary authentication computing system 112 are generally structured as described above with respect to FIG. 1. Additionally, the sending party financial institution computing system 502 is generally structured similarly to the sending party financial institution computing system 106 as described above with respect to FIG. 1. For example, in practice, the sending party financial institution computing system 502 includes server computer systems and one or more circuits (e.g., one or more processors and non-transitory storage mediums housing one or more logics). An embodiment of the sending party financial institution computing system 502 is described in further detail below with respect to FIG. 8.

The merchant computing system 504 is a computing system associated with a merchant with which a customer (e.g., the receiving party) may transact. Examples of merchants include, for example, retailers, wholesalers, marketplace operators, service providers (e.g., loan services, cleaning services, transportation providers, etc.), and so on. In various embodiments, the merchant computing system 504 may be a computing system of a brick-and-mortar merchant location, or a computing system implementing a merchant website responsive to the customer indicating a preference to engage in a transaction via the merchant website. In some arrangements, the merchant computing system 504 is used to create and store data relating to customer transactions (e.g., purchases and refunds). In some arrangements, the merchant computing system 504 can store databases of information relating to customers, such as names, shipping addresses, contact information, and so on. It should be noted that the term "merchant" is used herein for exemplary purposes only. The systems and methods disclosed herein with respect to the value transfer system 500 are compatible with any situation in which customers seek to transact with any type of entity. An embodiment of the merchant computing system 504 is described in further detail below with respect to FIG. 9.

The merchant financial institution computing system 506 is a computing system associated with or operated by a financial institution (e.g., a bank, a credit card issuer, etc.) in connection with the merchant of the merchant computing system 504. In various embodiments, the merchant financial institution computing system 506 may be structured similarly to the sending party financial institution computing system 502. An embodiment of the merchant financial institution computing system 506 is described in further detail below with respect to FIG. 10.

In general, the value transfer system 500 is structured to provide a value transfer according to the sending process 150, the receiving process 152, and the coordinating process 154 shown in FIGS. 2A-2C. However, referring to step 182 of FIG. 2C, the value transfer system 500 may be structured to provide the value transfer differently from the specific embodiments described above with respect to step 182. Accordingly, in various embodiments, the value transfer system 500 may be structured to allow the receiving party to purchase goods or services from the merchant such that, rather than the receiving party providing the payment for the purchase, the sending party financial institution computing system 502 provides the payment for some or all of the goods or services. In doing so, the sending party financial institution computing system 502 transfers the amount of the purchase from an account held by the sending party at the financial institution to the merchant financial institution computing system 506.

As an illustration, the sending party may create a value transfer message that includes a promise to pay for a certain number or amount of goods or services from a specific merchant or from a list of possible merchants. The sending party signcrypts the value transfer message via the sending party device 102 and provides the message to the receiving party device 104. The receiving party device 104 de-signcrypts the message and presents the message as a form of payment to the merchant (e.g., the specific merchant or a merchant from the list of possible merchants). For example, the receiving party device 104 may display the message (e.g., via the display 406 of the receiving party device 104), send the message to a point-of-sale device at a merchant location (e.g., via RFID), enter in a code associated with the message, and so on. Alternatively, when the receiving party device 104 de-signcrypts the message, the receiving party device 104 may send the message to the sending party financial institution computing system 502, and either the receiving party device 104 or the sending party financial institution computing system 502 may send the de-signcrypted message to the merchant computing system 504. Accordingly, the merchant computing system 504 may store the message such that the receiving party need only provide proof of the receiving party's identity to the merchant computing system 504 (e.g., by providing a PIN at a point-of-sale device at a merchant location, etc.) to present the message as a form of payment.

Once presented as payment to the merchant, the message is then provided to the sending party financial institution computing system 502, which authorizes payment to the merchant financial institution computing system 506 from one or more of the sending party's accounts held at the sending party's financial institution. However, in some embodiments, when deciding whether to authorize the transaction (i.e., the value transfer as a merchant payment), the sending party financial institution computing system 502 may determine whether the transaction satisfies certain instructions or rules received from the sending party regarding the value transfer. For example, the sending party may authorize the sending party financial institution computing system 502 to carry out a merchant payment value transfer only for certain universal product codes (UPCs) or certain categories of products. Accordingly, the sending party financial institution computing system 502 may request and receive from the merchant computing system 504 the UPCs of the products that the receiving party wishes to buy from the merchant. The computing system 502 may verify that those UPCs are within the UPCs or the category of products for which the sending party has authorized payment, and the computing system 502 may only carry out the merchant payment value transfer if that condition is satisfied.

As a more specific illustration of a value transfer carried out through the system 500, the sending party may be the parent of a college student, and the college student may be the receiving party. The parent may create a value transfer message that includes an authorization to pay for books from the bookstore of the student's college. Accordingly, when the student attempts to buy books from the college bookstore, the college bookstore's computing system (i.e., the merchant computing system 504) may send to the computing system of the parent's financial institution (i.e., the sending party financial institution computing system 502) the International Standard Book Numbers (ISBNs) of the books the student is attempting to buy. The computing system 502, recognizing that the student's planned purchase matches the criteria for an authorized merchant payment (i.e., that the student is buying books from the college bookstore), may provide a payment to the financial institution of the college bookstore (i.e., the merchant financial institution computing system 506) in the amount of the books. However, if the student attempts to buy anything other than books (e.g., college apparel), the computing system 502 may not authorize the payment or authorize the payment only for the amount of the books. Similarly, if the student attempts to buy books at a location that is not the college bookstore, the computing system 502 may not authorize the payment.

Figure 8:
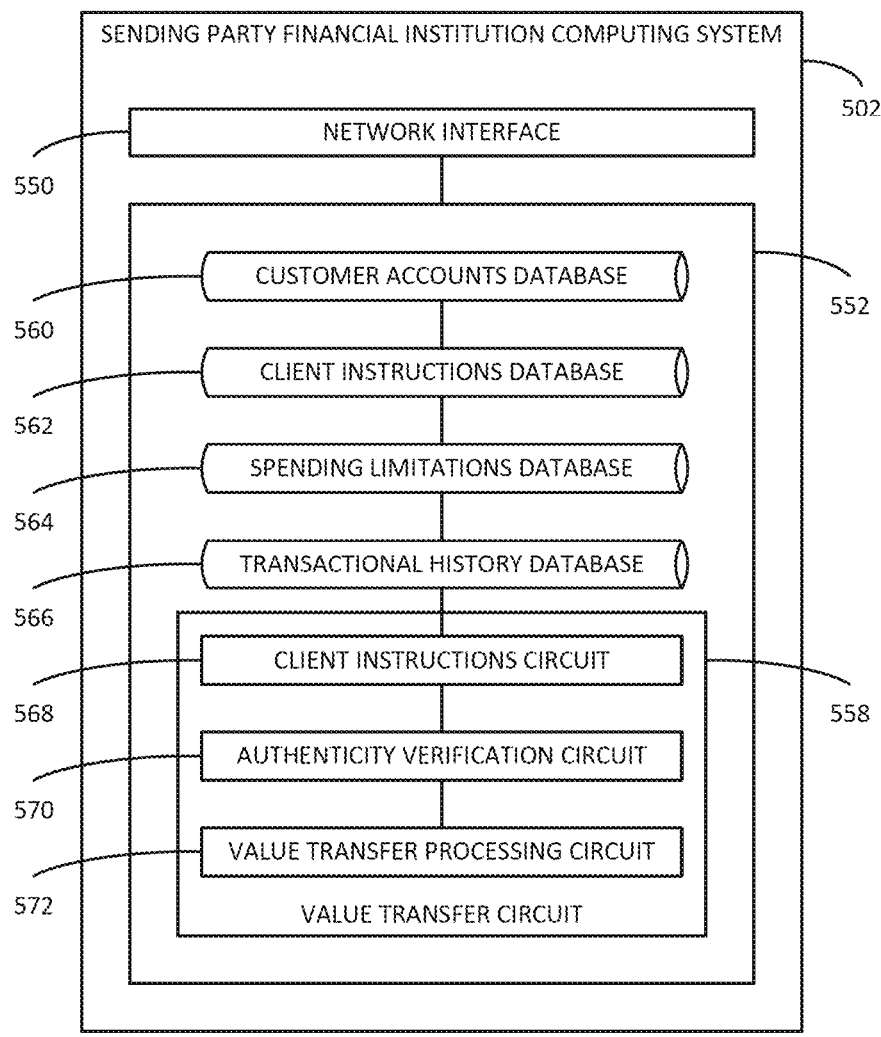
FIG. 8 is a detailed schematic diagram of a sending party financial institution computing system of FIG. 7, according to one embodiment.

Referring now to FIG. 8, a detailed schematic diagram of the sending party financial institution computing system 502 is shown, according to an example embodiment. Similar to the sending party financial institution computing system 106 shown in FIG. 5, in various embodiments the sending party financial institution computing system 502 includes a network interface 550 and a processing circuit 552. The network interface 550 is structured similarly to the network interface 350 described above with respect to FIG. 5. Additionally, the processing circuit 552 includes a customer accounts database 560, a client instructions database 562, a spending limitations database 564, a transactional history database 566, and a value transfer circuit 558. In various embodiments, the customer accounts database 560, the client instructions database 562, and the transactional history database 566 are, respectively, structured similarly to the customer accounts database 360, the client instructions database 362, and the transactional history database 364 described above with respect to FIG. 5.

The spending limitations database 564 is structured to store limitations received from the sending party regarding merchant payment value transfers. The limitations may include from which merchants the receiving party may redeem the message for payment, how many or how much in goods or services the message may be redeemed for, what types of goods or services the message may be redeemed for, a time frame during which the message may be redeemed for payment, and so on. For example, the sending party may specify a certain type of UPCs that the payment may be redeemed for, the sending party may specify that the payment may only be redeemed for ISBN, the sending party may specify a certain merchant that the receiving party must purchase the goods or services from, and so on. In some embodiments, the sending party may indicate the spending limitations in the value transfer message, while in other embodiments, the sending party may, additionally or alternatively, indicate the spending limitations in a different communication to the computing system 502.

Similar to the value transfer circuit 358 of the sending party financial institution computing system 106, the computing system 502 uses the value transfer circuit 558 to perform various functions described herein. As shown in FIG. 8, the value transfer circuit 558 includes a client instructions circuit 568, an authenticity verification circuit 570, and a value transfer processing circuit 572. The client instructions circuit 568 is generally structured similarly to the client instructions circuit 366 discussed above with respect to FIG. 5. Additionally, the client instructions circuit 568 may be further structured to determine any spending limitations provided by the sending party in a given value transfer message and/or received through a separate communication from the sending party. The client instructions circuit 568 accordingly stores any determined spending limitations in the spending limitations database 564.

The authenticity verification circuit 570 is also generally structured similarly to the authenticity verification circuit 368 discussed above with respect to FIG. 5. In some embodiments, the authenticity verification circuit 570 may be further structured to verify whether a given communication from the merchant computing system 504 and/or from the merchant financial institution computing system 506 is authentic. For example, the communication may be digitally signed with a private key of the merchant computing system 504 or the merchant financial institution computing system 506, and the authenticity verification circuit 570 may use the corresponding public key to verify the identity of the sender.

Likewise, the value transfer processing circuit 572 is generally structured similarly to the value transfer processing circuit 370 described above with respect to FIG. 5. Additionally, the value transfer processing circuit 572 may be structured to carry out value transfers to the merchant financial institution computing system 506 as described above with respect to FIG. 7. Moreover, in various embodiments, the value transfer processing circuit 572 may be structured to verify with the spending limitations database 564 whether a given desired purchase complies with the stored spending limitations, as discussed above with respect to the spending limitations database 564. The value transfer processing circuit 572 may accordingly only authorize the transfer of a payment to the merchant financial institution computing system 506 if the desired purchase does not violate one or more of the stored spending limitations.

Figure 9:
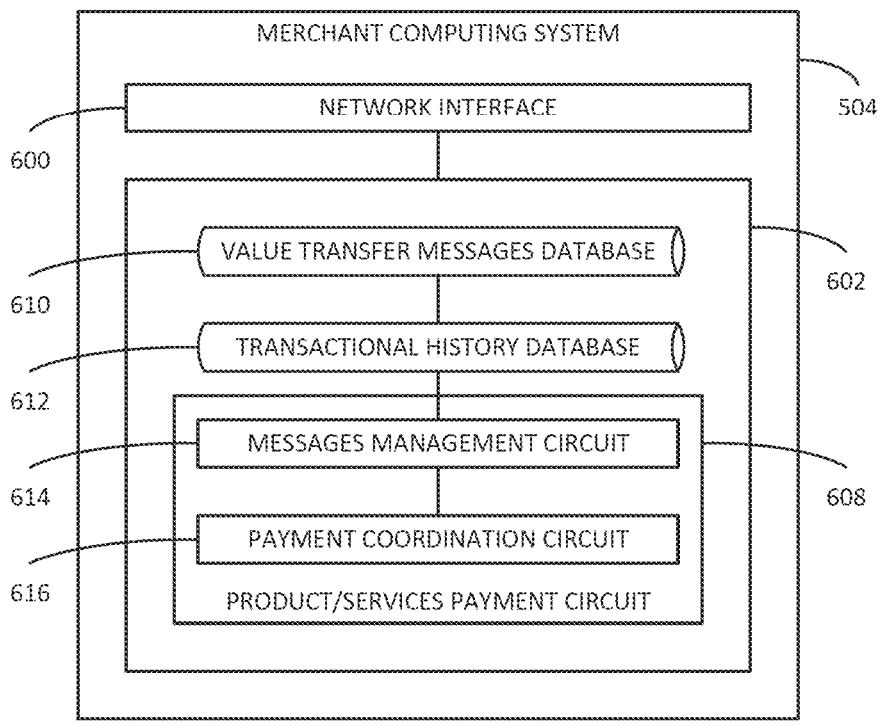
FIG. 9 is a detailed schematic diagram of a merchant computing system of FIG. 7, according to one embodiment.

Referring now to FIG. 9, a detailed schematic diagram of the merchant computing system 504 is shown, according to an example embodiment. As shown, in various embodiments, the merchant computing system 504 includes a network interface 600 and a processing circuit 602. The network interface 600 of the merchant computing system 504 is adapted for and configured to establish a communication session via the network 110 with the other components of the value transfer system 500.

The processing circuit 602 includes a value transfer messages database 610, a transactional history database 612, and a product/services payment circuit 608. As described above with respect to FIG. 7, in various embodiments, once a merchant payment value transfer message is de-signcrypted, the receiving party device 104 and/or the sending party financial institution computing system 502 may send the de-signcrypted message to the merchant computing system 504 to be stored for future payment purposes. Accordingly, the value transfer messages database 610 may be structured to store a plurality of de-signcrypted value transfer messages received from receiving party devices 104 and/or sending party financial institution computing systems 502. In this way, the merchant computing system 504 may keep records of various value transfer messages. Additionally, in some embodiments, by storing the de-signcrypted value transfer messages, the value transfer messages database 610 may obviate the need for a receiving party to present the de-signcrypted value transfer message to the merchant when paying for goods or services from the merchant. Instead, the receiving party may simply identify himself or herself to the merchant computing system 504 (e.g., by entering in a PIN on a point-of-sale device, etc.). The merchant computing system 504 then retrieved the de-signcrypted message associated with the receiving party from the value transfer messages database 610 and coordinates the payment for the desired purchase as discussed in further detail below.

The transactional history database 612 may be structured to store details about transactions that occur between the merchant and receiving parties. For example, the transactional history database 612 may store the amount of a purchase, information about the goods or services of the purchase, information about the value transfer message used to pay for the purchase, and so on.

The merchant computing system 504 uses the product/services payment circuit 608 to perform various functions described herein. As shown in FIG. 9, in various embodiments, the product/services payment circuit 608 includes a messages management circuit 614 and a payment coordination circuit 616. The messages management circuit 614 is structured to receive and store value transfer messages in the value transfer messages database 610. In certain embodiments, the messages management circuit may authenticate the messages (e.g., using similar authentication methods as those described above with respect to the authenticity verification circuit 368 of FIG. 5) before storing the message. Additionally, the messages management circuit 614 may store in the value transfer messages database 610 a way for the receiving party to identify himself or herself to the merchant computing system 504. For example, the receiving party may create a password or a PIN that the messages management circuit 614 stores in the value transfer messages database 610 in association with the receiving party's de-signcrypted value transfer message. The receiving party may then be able to use the password or PIN to identify himself or herself to the merchant computing system 504 (e.g., by entering the password or PIN on a point-of-sale device, by entering in the password or PIN through an online checkout process, etc.).

The payment coordination circuit 616 is structured to coordinate a payment for a purchase of products or services from the merchant via a value transfer message. For example, in one embodiment, the receiving party device 104 may de-signcrypt a merchant payment value transfer message. The receiving party device 104 may further receive information about the desired purchase (e.g., as inputted by the receiving party, as received from or generated by a point-of-sale device, etc.), and the receiving party device 104 may provide to the sending party financial institution computing system 502 the de-signcrypted message along with the information about the desired purchase. The payment coordination circuit 616 may then communicate with the sending party financial institution computing system 502 regarding the purchase before the computing system 502 decides to authenticate the merchant payment (e.g., as described above with respect to FIG. 7).

In another embodiment, the receiving party may provide to the payment coordination circuit 616 an indicator of the receiving party's identity (e.g., a PIN, a password, etc.). For example, the receiving party may enter in a PIN or password on a point-of-sale device, through an online checkout system, and so on. The payment coordination circuit 616 may use the indicator to retrieve a stored value transfer message for the receiving party from the value transfer messages database 610. The payment coordination circuit 616 may then communicate with the sending party financial institution computing system 502 regarding payment for the purchase from a sending party account at the financial institution, as authorized by the retrieved de-signcrypted value transfer message. For example, the payment coordination circuit 616 may provide to the sending party financial institution computing system 502 information about the purchase such that the computing system 502 may determine whether the purchase meets certain spending limits, as discussed above with respect to FIG. 8.

After the payment coordination circuit 616 coordinates the payment for the transaction, the payment coordination circuit 616 may store information about the transaction in the transactional history database 612. Additionally, in some embodiments, the payment coordination circuit 616 may generate a receipt for the sending party financial institution computing system 502, the receiving party, and/or the sending party.

Figure 10:
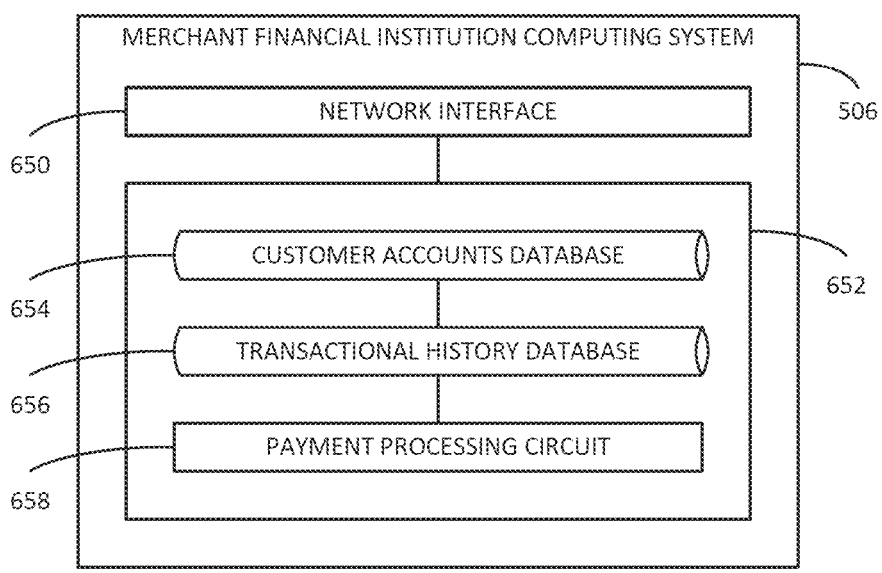
FIG. 10 is a detailed schematic diagram of a merchant financial institution computing system of FIG. 7, according to one embodiment.

Referring now to FIG. 10, a detailed schematic diagram of the merchant financial institution computing system 506 is shown, according to an example embodiment. As shown, in various embodiments, the merchant financial institution computing system 506 includes a network interface 650 and a processing circuit 652. The network interface 650 of the merchant financial institution computing system 506 is adapted for and configured to establish a communication session via the network 110 with the other components of the value transfer system 500.

The processing circuit 652 includes a customer accounts database 654, a transactional history database 656, and a payment processing circuit 658. In various embodiments, the customer accounts database 654 is structured similarly to the customer accounts database 560 of the sending party financial institution computing system 502 except that the customer accounts database 654 stores information relating to at least one account (e.g., a checking account, a savings account, a credit card account etc.) held by a merchant at the financial institution associated with the computing system 506. Likewise, in various embodiments, the transactional history database 656 is structured similarly to the transactional history database 364 of the sending party financial institution computing system 502, storing information about completed value transfers made to the merchant account(s) (i.e., information about fund transfers from a sending party account to one or more merchant accounts held at the merchant's financial institution).

In various embodiments, the payment processing circuit 658 is structured to process a payment from an account of the sending party to at least one account of the merchant held at the merchant's financial institution. For example, the payment processing circuit 658 may receive a payment for a merchant account from the sending party financial institution computing system 502, coordinated through a value transfer message and the payment coordination circuit 616 of the merchant computing system 504 as described above, and update the balance of the at least one account in the customer accounts database 654. The payment processing circuit 658 may further store details about the payment in the transactional history database 656. In certain embodiments, the payment processing circuit 658 may be further structured to post information relating to the payment as a hash on a blockchain, similar to the value transfer processing circuits 370 and 572 as described above.

Certain embodiments of a value transfer system have been described herein. However, those of skill in the art will appreciate that a value transfer system using signcryption may be used to carry out other types of transfers or transactions. For example, a private/public key pair may be associated with the door of a hotel room. A user may create a message including a code or other identifier for getting into the door of the hotel room and signcrypt the message with the user's public/private key pair and the public/private key pair of a customer booked for the hotel room. The customer may de-signcrypt the message and thereby be able to enter the hotel room during the duration of the customer's booking for the hotel room, after which the code or other identifier expires. Similarly, signcryption could be used to limit access for employees or contractors to certain parts of a building. As another example, the sending party may be an insurance company, and the receiving party may be an individual who has purchased travel insurance from the insurance company. A computing system of the insurance company may implement the travel insurance as a smart contract such that the computing system monitors the status of the individual's flight. If the individual's flight is delayed or cancelled, the computing system creates a set of vouchers for the individual, signcrypts the vouchers, and sends the vouchers to the individual. For example, the vouchers may include a voucher for night at a nearby hotel, a voucher for food, and so on. The computing system sets up the vouchers such that they expire if not used in, for example, twenty-four hours. As yet another example, the value transfer message may be a social security or pension value transfer. Accordingly, the receiving party, who is the social security or pension beneficiary, may need to de-signcrypt the value transfer message and provide a biometric (e.g., a fingerprint, a retinal scan, a voice pattern, etc.) as proof of life to receive the social security or pension payment. As still another example, a musician may use signcryption to limit who has access to the musician's music and thereby enforce digital rights management. Moreover, further example embodiments are additionally contemplated by this application.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

It should also be understood that a "computing system" as described herein may, in practice, include server computer systems. For example, a computing system may comprise one or more networked computer servers together having at least a processor and non-transitory machine readable media with instructions stored thereon. A computing system may further include one or more circuits (e.g., one or more processors and non-transitory storage mediums housing one or more logics) that are structured to allow the computing system to exchange data over a network (e.g., network 110), execute software applications, access websites, generate graphical user interfaces, and perform other operations described herein.

An exemplary system for implementing the overall system or portions of the embodiments might include general purpose computing computers, including processing units, system memory, and system buses that couple various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data that cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

As used herein, a "network interface" may include any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), and a combination thereof (e.g., both a cellular transceiver and a Bluetooth transceiver).

It should be noted that an "input/output circuit" as described herein may be implemented as any combination of hardware components, communication circuitry, and machine-readable media. For example, in one arrangement, an input/output circuit may include an input/output device. In another arrangement, an input/output circuit may include communication circuitry for facilitating the exchange of data, values, messages, and the like between an input/output device and components of a device or system into which the input/output circuit is incorporated. In yet another arrangement, an input/output circuit may include machine-readable media for facilitating the exchange of information between an input/output device and components of a device or system into which the input/output circuit is incorporated.

It should also be noted that the term "input/output device" as described herein may include various hardware and associated logics to enable a user to communicate with a device or system into which the input/output device is incorporated. In certain arrangements, an input aspect of an input/output device may include, for example, a keyboard, a mouse, a keypad, a touchscreen, a touchpad, a joystick, a microphone, a camera, a scanner, a fingerprint scanner, an eye scanner, a sensor that detects movement, accelerometers, a user input device engageable to the sending party device 102 via a USB, via a serial cable, via an Ethernet cable, wirelessly, and so on, or any other type of input device performing a similar function. Similarly, in certain arrangements, an output aspect of an input/output device may include, for example, a display, a printer, a speaker, a vibrating component such as a motor, illuminating icons, LEDs, an output device engageable to the sending party device 102 via a USB, via a serial cable, via an Ethernet connection, wirelessly, and so on, or any other type of output device performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A method of carrying out a value transfer comprising:
   receiving, by a computing system of a financial institution, a de-signcrypted value transfer message, the de-signcrypted value transfer message comprising:
   terms of a value transfer from an account of a sending party to an account of a merchant, wherein a receiving party desires to make a purchase from the merchant and the value transfer is a payment from the sending party account to the merchant account; and
   one or more spending limitations comprising at least one limit on the desired purchase, wherein the payment from the sending party account to the merchant account is contingent on the desired purchase meeting the one or more spending limitations:
   verifying, by the financial institution computing system, an authenticity of the de-signcrypted value transfer message using a public key of the sending party and a private key of the financial institution; and
   dispersing, by the financial institution computing system, funds according to the terms of the value transfer.

2. The method of claim 1, the method further comprising receiving, by the financial institution computing system, at least one secondary authentication factor from the receiving party.

3. The method of claim 2, wherein the at least one secondary authentication factor comprises at least one of a knowledge factor, a possession factor, a digital identity certificate, a scan of an identity card, or a biometric sample.

4. The method of claim 1, wherein the value transfer is a cash delivery.

5. The method of claim 1, wherein the one or more spending limitations comprises a list of merchants the receiving party can make a purchase from, and wherein the value transfer is a payment from the sending party account to one or more accounts of one or more merchants from the list of merchants.

6. The method of claim 1, further comprising sending, by the financial institution computing system, a transfer confirmation to the receiving party; and
   receiving a receipt, the receipt having been generated by a device associated with the receiving party in response to receiving the transfer confirmation.

7. The method of claim 6, wherein the receipt is digitally signed by the receiving party, the method further comprising verifying the digital signature of the receiving party.

8. The method of claim 1, wherein the value transfer message includes a unique identifier.

9. A system for carrying out a value transfer, the system comprising:
   a processor; and
   a non-transitory machine readable medium with instructions stored thereon that, when executed by the processor, cause the system to:
   receive a de-signcrypted value transfer message, the de-signcrypted value transfer message comprising:
   terms of a value transfer from an account of a sending party to an account of a merchant, wherein a receiving party desires to make a purchase from the merchant and the value transfer is a payment from the sending party account to the merchant account; and
   one or more spending limitations comprising at least one limit on the desired purchase, wherein the payment from the sending party account to the merchant account is contingent on the desired purchase meeting the one or more spending limitations:
   verify an authenticity of the de-signcrypted value transfer message using a public key of the sending party and a private key of a financial institution; and
   disperse funds according to the terms of the value transfer.

10. The system of claim 9, wherein the instructions further cause the system to receive at least one secondary authentication factor from the receiving party.

11. The system of claim 10, wherein the at least one secondary authentication factor comprises at least one of a knowledge factor, a possession factor, a digital identity certificate, a scan of an identity card, or a biometric sample.

12. The system of claim 9, wherein the value transfer is a cash delivery.

13. The system of claim 9, wherein the one or more spending limitations comprises a list of merchants the receiving party can make a purchase from, and wherein the value transfer is a payment from the sending party account to one or more accounts of one or more merchants from the list of merchants.

14. The system of claim 9, wherein the instructions further cause the system to send a transfer confirmation to the receiving party; and
   receiving a receipt, the receipt having been generated by a device associated with the receiving party in response to receiving the transfer confirmation.

15. The system of claim 14, wherein the receipt is digitally signed by the receiving party, the method further comprising verifying the digital signature of the receiving party.

16. The system of claim 9, wherein the value transfer message includes a unique identifier.

17. A method of carrying out a value transfer, comprising:
   receiving, by a computing system of a financial institution, a de-signcrypted value transfer message, the de-signcrypted value transfer message comprising:
   terms of a value transfer from an account of a sending party to an account of a merchant, wherein a receiving party desires to make a purchase from the merchant and the value transfer is a payment from the sending party account to the merchant account; and
   one or more spending limitations comprising at least one limit on the desired purchase, wherein the payment from the sending party account to the merchant account is contingent on the desired purchase meeting the one or more spending limitations;
   receiving, by the financial institution computing system, a transfer verification token;
   verifying, by the financial institution computing system, an authenticity of the de-signcrypted value transfer message using the transfer verification token; and
   dispersing, by the financial institution computing system, funds according to the terms of the value transfer.

18. The method of claim 17, wherein the transfer verification token is signcrypted by a device of the sending party.

19. The method of claim 18, wherein the transfer verification token is included in the value transfer message.

20. The method of claim 18, further comprising designcrypting the signcrypted transfer verification token using a public key of the sending party and a private key of the financial institution.

\* \* \* \* \*